(12) United States Patent
Takahama

(10) Patent No.: US 12,036,989 B2
(45) Date of Patent: Jul. 16, 2024

(54) VEHICLE CONTROL DEVICE, VEHICLE CONTROL METHOD, AND VEHICLE CONTROL SYSTEM

(71) Applicant: Hitachi Astemo, Ltd., Hitachinaka (JP)

(72) Inventor: Taku Takahama, Hitachinaka (JP)

(73) Assignee: Hitachi Astemo, Ltd., Hitachinaka (JP)

(*) Notice: Subject to any disclaimer, the term of this patent is extended or adjusted under 35 U.S.C. 154(b) by 381 days.

(21) Appl. No.: 17/433,447

(22) PCT Filed: Jan. 17, 2020

(86) PCT No.: PCT/JP2020/001420
§ 371 (c)(1),
(2) Date: Aug. 24, 2021

(87) PCT Pub. No.: WO2020/174920
PCT Pub. Date: Sep. 3, 2020

(65) Prior Publication Data
US 2022/0144270 A1    May 12, 2022

(30) Foreign Application Priority Data
Feb. 25, 2019 (JP) .................. 2019-031676

(51) Int. Cl.
*B60W 30/16* (2020.01)
*B60W 10/04* (2006.01)
*B60W 10/18* (2012.01)

(52) U.S. Cl.
CPC .......... *B60W 30/162* (2013.01); *B60W 10/04* (2013.01); *B60W 10/18* (2013.01);
(Continued)

(58) Field of Classification Search
CPC .................. B60W 2050/0075; B60W 2754/30
See application file for complete search history.

(56) References Cited

U.S. PATENT DOCUMENTS

2004/0195022 A1    10/2004 Inoue
2007/0255478 A1*   11/2007 Wakashiro ............ B60W 10/06
                                                           701/96
(Continued)

FOREIGN PATENT DOCUMENTS

DE    10 2015 003 344 A1    9/2016
JP    62-21087 A             1/1987
(Continued)

OTHER PUBLICATIONS

Extended European Search Report issued in European Application No. 20763267.0 dated Mar. 25, 2022 (eight (8) pages).
(Continued)

*Primary Examiner* — Jaime Figueroa
*Assistant Examiner* — Jerrod Irvin Davis
(74) *Attorney, Agent, or Firm* — Crowell & Moring LLP

(57) ABSTRACT

The vehicle control device, independently of acceleration and deceleration operation by a vehicle driver, adjusts a vehicle speed to a predetermined target vehicle speed or adjusts an inter-vehicle interval between the vehicle and a preceding vehicle which travels ahead of the vehicle, to a predetermined target inter-vehicle interval. The vehicle control device obtains information concerning the inter-vehicle interval between the vehicle and the preceding vehicle and information concerning acceleration and deceleration operations by the driver, to update settings of the target vehicle speed and the target inter-vehicle interval according to the obtained information concerning the inter-vehicle interval and the acceleration and deceleration operation. Furthermore, the vehicle control device outputs, to a braking/driving device (a brake pedal and an engine) of the vehicle, a braking/driving command (a driving command and a braking command) for adjusting traveling state based on the
(Continued)

updated target vehicle speed and target inter-vehicle interval.

14 Claims, 21 Drawing Sheets

(52) U.S. Cl.
CPC .............. *B60W 2554/4041* (2020.02); *B60W 2554/802* (2020.02); *B60W 2710/18* (2013.01); *B60W 2720/10* (2013.01); *B60W 2754/30* (2020.02)

(56) References Cited

U.S. PATENT DOCUMENTS

| | | | |
|---|---|---|---|
| 2011/0276246 | A1 | 11/2011 | Kuze |
| 2012/0065863 | A1 | 3/2012 | Takagi et al. |
| 2016/0009284 | A1* | 1/2016 | Tokimasa .............. G01S 13/867 701/96 |
| 2021/0188323 | A1* | 6/2021 | Kohlhuber ............ B60W 50/10 |

FOREIGN PATENT DOCUMENTS

| | | |
|---|---|---|
| JP | 11-189069 A | 7/1999 |
| JP | 2001-30796 A | 2/2001 |
| JP | 2004-299427 A | 10/2004 |
| JP | 2004-306690 A | 11/2004 |
| JP | 2008-12951 A | 1/2008 |
| JP | 2008-120288 A | 5/2008 |
| JP | 2009-208735 A | 9/2009 |
| JP | 2012-240532 A | 12/2012 |
| JP | 2017-170979 A | 9/2017 |
| WO | WO 2015/121546 A1 | 8/2015 |

OTHER PUBLICATIONS

Cover Page of EP 3 105 752 A0 published Dec. 21, 2016 (one (1) page).
International Preliminary Report on Patentability (PCT/IB/326, PCT/IB/338 & PCT/IB/373) issued in PCT Application No. PCT/JP2020/001420 dated Sep. 2, 2021, including English translation of document C2 (Japanese-language Written Opinion (PCT/ISA/237) filed on Aug. 24, 2021) (10 pages).
International Search Report (PCT/ISA/210) issued in PCT Application No. PCT/JP2020/001420 dated Apr. 7, 2020 with English translation (seven (7) pages).
Japanese-language Written Opinion (PCT/ISA/237) issued in PCT Application No. PCT/JP2020/001420 dated Apr. 7, 2020 (six (6) pages).

* cited by examiner

FIG.3

| INTER-VEHICLE INTERVAL | TARGET VEHICLE SPEED | TARGET INTER-VEHICLE INTERVAL |
|---|---|---|
| VERY LONG OR NO PRECEDING VEHICLE (INTER-VEHICLE INTERVAL > FIRST THRESHOLD) | COMPARED WITH TRAVELING SPEED A: SELECT HIGHER SPEED B: SELECT LOWER SPEED | NOT CHANGED |
| BETWEEN PREDETERMINED INTERVAL D1 AND PREDETERMINED INTERVAL D2 (FIRST THRESHOLD > INTER-VEHICLE INTERVAL > SECOND THRESHOLD) | COMPARED WITH TRAVELING SPEED+α A: SELECT HIGHER SPEED B: SELECT LOWER SPEED | COMPARED WITH INTER-VEHICLE DISTANCE A: SELECT SHORTER DISTANCE B: SELECT LONGER DISTANCE |
| SHORT INTER-VEHICLE INTERVAL (INTER-VEHICLE INTERVAL < SECOND THRESHOLD) | NOT CHANGED | COMPARED WITH INTER-VEHICLE DISTANCE A: SELECT SHORTER DISTANCE B: SELECT LONGER DISTANCE |

FIG.6

| INTER-VEHICLE INTERVAL STATE | SETTING OF TARGET VEHICLE SPEED | SETTING OF TARGET INTER-VEHICLE INTERVAL |
|---|---|---|
| INTER-VEHICLE INTERVAL > PREDETERMINED TIME T1 OR NO PRECEDING VEHICLE | A: SELECT HIGHER SPEED DURING LAST 3 SECONDS OF PEDAL OPERATION<br>B: SELECT LOWER SPEED DURING LAST 3 SECONDS OF PEDAL OPERATION | NOT CHANGED |
| INTER-VEHICLE INTERVAL < PREDETERMINED TIME T2 | NOT CHANGED | EXCEPT FOR TRAVELING AT EXTREMELY LOW SPEED, COMPARED WITH INTER-VEHICLE TIME<br>A: SELECT SHORTER TIME DURING LAST 3 SECONDS OF PEDAL OPERATION<br>B: SELECT LONGER TIME DURING LAST 3 SECONDS OF PEDAL OPERATION<br>AT TRAVELING THE EXTREMELY LOW SPEED SET TARGET INTER-VEHICLE INTERVAL ACCORDING TO INTER-VEHICLE DISTANCE |
| OTHER CASES (FOLLOWING APPROPRIATELY) | A: SELECT HIGHER SPEED DURING LAST 3 SECONDS OF PEDAL OPERATION +10 KM/H<br>B: SELECT LOWER SPEED DURING LAST 3 SECONDS OF PEDAL OPERATION | SELECT SHORTER INTERVAL DURING LAST 3 SECONDS OF PEDAL OPERATION<br>SELECT LONGER INTERVAL DURING LAST 3 SECONDS OF PEDAL OPERATION |

FIG.7A
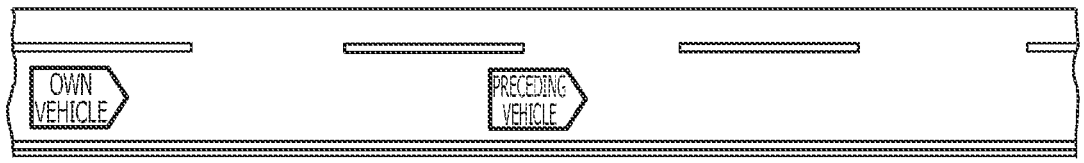
FIG.7B
| VEHICLE SPEED | TARGET | 65km/h |
|---|---|---|
| | MEASURED | 55km/h |
| INTER-VEHICLE INTERVAL | TARGET | 1.5s |
| | MEASURED | 1.5s |
FIG.8A
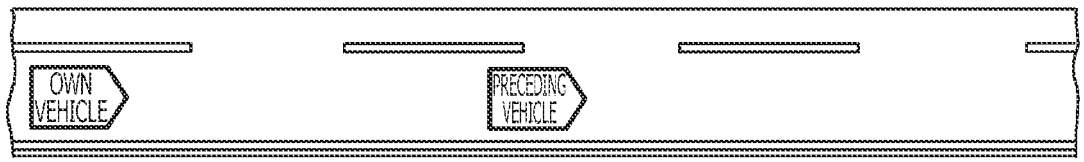
FIG.8B
| VEHICLE SPEED | TARGET | 65km/h |
|---|---|---|
| | MEASURED | 55km/h |
| INTER-VEHICLE INTERVAL | TARGET | 1.5s |
| | MEASURED | 1.5s |

FIG.9A
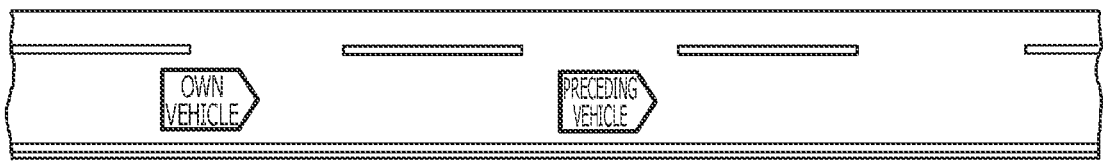
FIG.9B
| VEHICLE SPEED | TARGET | 70km/h |
|---|---|---|
| | MEASURED | 60km/h |
| INTER-VEHICLE INTERVAL | TARGET | 1.0s |
| | MEASURED | 1.0s |
FIG.10A
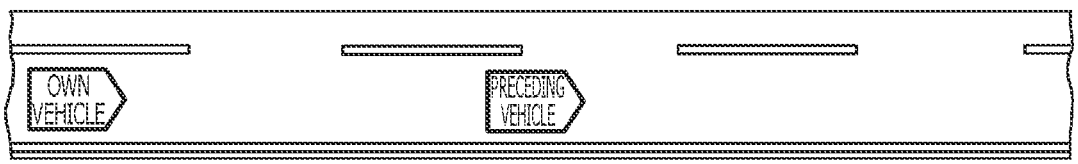
FIG.10B
| VEHICLE SPEED | TARGET | 65km/h |
|---|---|---|
| | MEASURED | 55km/h |
| INTER-VEHICLE INTERVAL | TARGET | 1.5s |
| | MEASURED | 1.5s |

FIG.11A
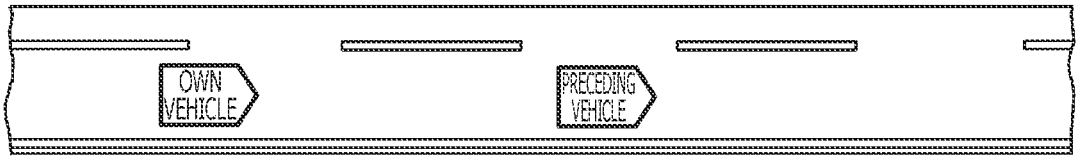
FIG.11B
| VEHICLE SPEED | TARGET | 70km/h |
|---|---|---|
| | MEASURED | 60km/h |
| INTER-VEHICLE INTERVAL | TARGET | 1.0s |
| | MEASURED | 1.0s |
FIG.12A
FIG.12B
| VEHICLE SPEED | TARGET | 70km/h |
|---|---|---|
| | MEASURED | 62km/h |
| INTER-VEHICLE INTERVAL | TARGET | 0.9s |
| | MEASURED | 0.9s |

FIG.13A
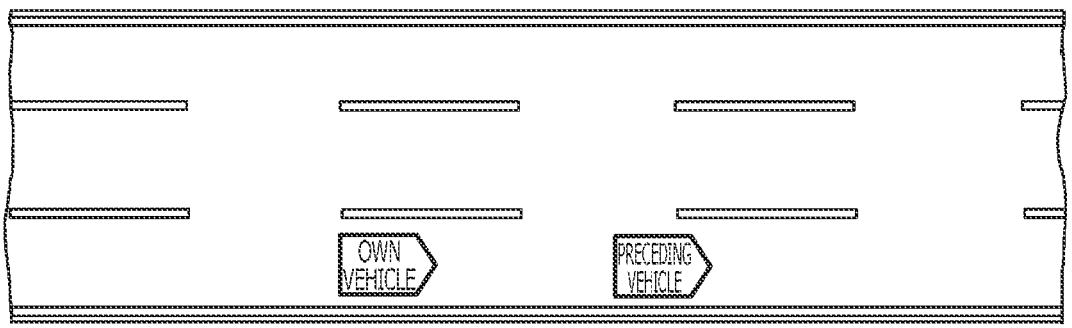
FIG.13B
| VEHICLE SPEED | TARGET | 70km/h |
|---|---|---|
| | MEASURED | 62km/h |
| INTER-VEHICLE INTERVAL | TARGET | 0.9s |
| | MEASURED | 0.9s |
FIG.14A
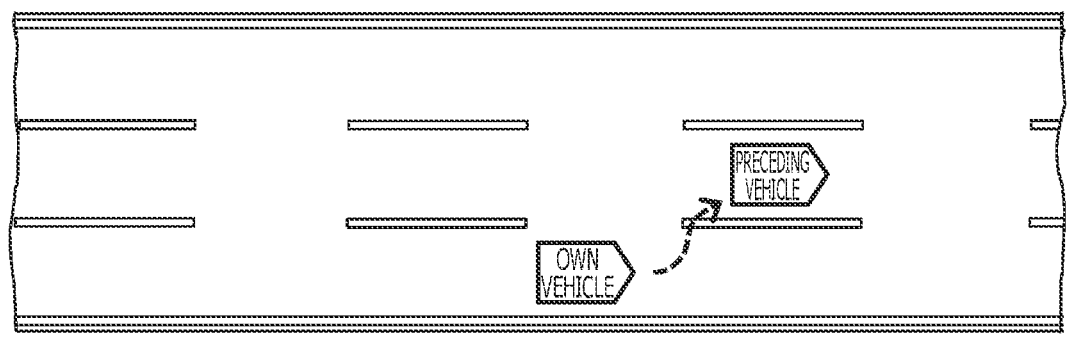
FIG.14B
| VEHICLE SPEED | TARGET | 64km/h |
|---|---|---|
| | MEASURED | 64km/h |
| INTER-VEHICLE INTERVAL | TARGET | 0.9s |
| | MEASURED | --- s |

FIG.15A
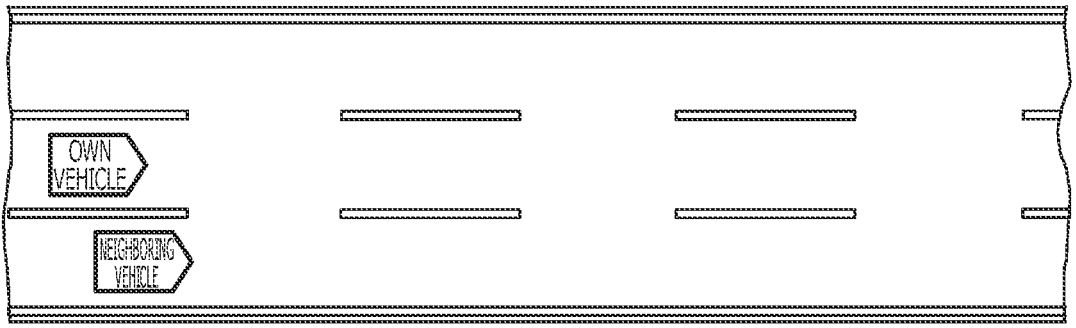
FIG.15B
| VEHICLE SPEED | TARGET | 64km/h |
|---|---|---|
| | MEASURED | 64km/h |
| INTER-VEHICLE INTERVAL | TARGET | 0.9s |
| | MEASURED | --- s |
FIG.16A
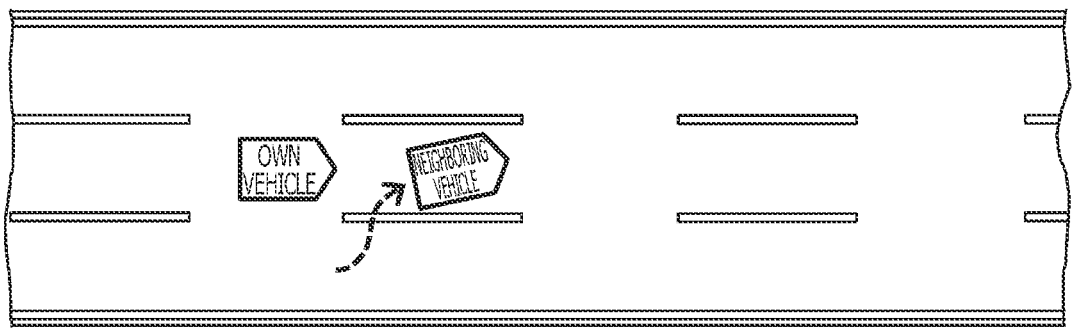
FIG.16B
| VEHICLE SPEED | TARGET | 80km/h |
|---|---|---|
| | MEASURED | 78km/h |
| INTER-VEHICLE INTERVAL | TARGET | 1.5s |
| | MEASURED | 0.9s |

| VEHICLE SPEED | TARGET | 80km/h |
|---|---|---|
| | MEASURED | 75km/h |
| INTER-VEHICLE INTERVAL | TARGET | 1.5s |
| | MEASURED | 1.2s |

FIG.20

| PEDAL OPERATION | EXTERNAL STATE | SETTING OF TARGET VEHICLE SPEED | SETTING OF TARGET INTER-VEHICLE INTERVAL |
|---|---|---|---|
| OPERATED | THERE IS NO PRECEDING VEHICLE | TARGET VEHICLE SPEED IS SET TO VEHICLE SPEED AT TIME WHEN RESPONSE DELAY OF ACTUATOR ELAPSES SINCE PEDAL IS FINALLY RELEASED | NOT CHANGED |
| OPERATED | THERE IS PRECEDING VEHICLE | NOT CHANGED | TARGET INTER-VEHICLE INTERVAL IS SET TO INTER-VEHICLE INTERVAL AT TIME WHEN RESPONSE DELAY TIME OF ACTUATOR ELAPSES SINCE PEDAL IS FINALLY RELEASED |
| OPERATED OR NOT OPERATED | ROAD TYPE IN MAP INFORMATION CHANGES | TARGET VEHICLE SPEED IS SET ACCORDING TO ROAD TYPE | NOT CHANGED |
| OPERATED OR NOT OPERATED | DETECTED SPEED SIGN | TARGET VEHICLE SPEED IS SET ACCORDING TO DETECTED SPEED SIGN | NOT CHANGED |

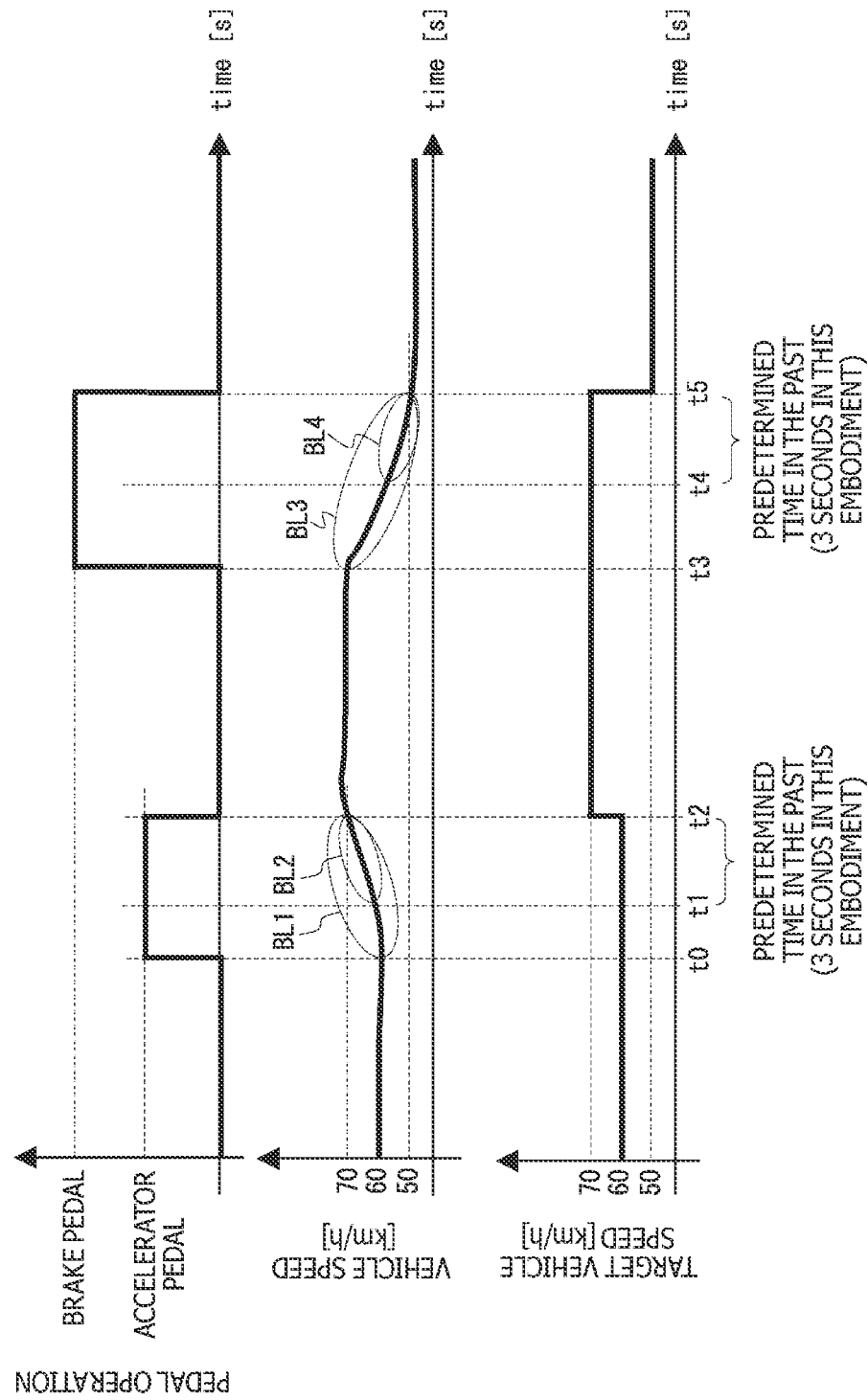

FIG.25A
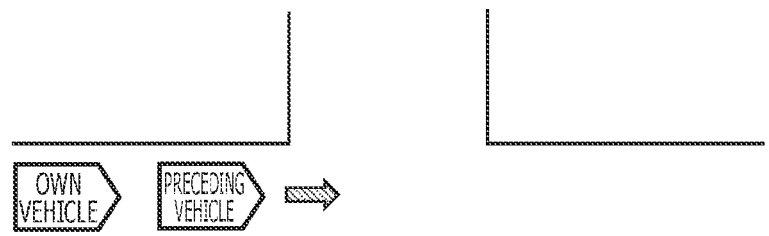
FIG.25B
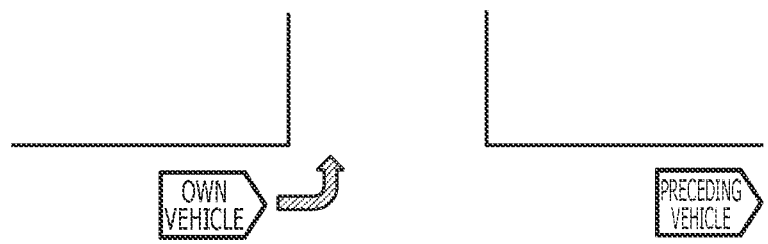

VEHICLE CONTROL DEVICE, VEHICLE CONTROL METHOD, AND VEHICLE CONTROL SYSTEM

TECHNICAL FIELD

The present invention relates to vehicle control devices and vehicle control methods for assisting the driving of a vehicle, and to vehicle control systems using the vehicle control device.

BACKGROUND ART

Conventionally, various vehicle control devices for assisting the driving of a vehicle have been proposed, and, as one example, the technique in Patent Document 1 is known. Patent Document 1 discloses a driving control device that controls a vehicle driving state according to a target upper speed and a target inter-vehicle distance, independently of operation of the accelerator pedal and the brake pedal by the vehicle driver. This driving control device sets and changes the target upper speed and the target inter-vehicle distance in response to predetermined accelerating and braking operations by the vehicle driver, to reduce operational burdens on the driver.

REFERENCE DOCUMENT LIST

Patent Document

Patent Document 1: JP 2004-306690 A

SUMMARY OF THE INVENTION

Problem to be Solved by the Invention

In Patent Document 1, if there is a preceding vehicle, the target inter-vehicle distance is compared with the current inter-vehicle distance to update the target inter-vehicle interval. If there is no preceding vehicle, the target vehicle speed is compared with the current vehicle speed to update the target vehicle speed. However, if only one of the target inter-vehicle distance and the target vehicle speed is updated to control the own vehicle, the vehicle driver may not exactly set the target inter-vehicle distance and the target vehicle speed, causing passengers discomfort.

The present invention has been made in view of the foregoing circumstances, and it has an object to provide a vehicle control device, a vehicle control method, and a vehicle control system which are capable of suppressing discomfort for passengers in a variety of situations, while reducing the operational burden of driving.

Means for Solving the Problem

In order to achieve the object, the vehicle control device according to the present invention comprises a controller that performs calculation for adjusting a speed of a vehicle operated by a driver to a predetermined target vehicle speed or adjusting an inter-vehicle interval between the vehicle and a preceding vehicle which travels ahead of the vehicle, to a predetermined target inter-vehicle interval, independently of acceleration and deceleration operations by the driver, wherein the controller obtains information concerning the inter-vehicle interval between the vehicle and the preceding vehicle, and information concerning the acceleration and deceleration operations by the driver, and updates settings of the target vehicle speed and the target inter-vehicle interval based on the obtained information concerning the inter-vehicle interval and information concerning the acceleration and deceleration operation, to output, to a braking/driving device of the vehicle, a command for adjusting traveling state based on the updated target vehicle speed and target inter-vehicle interval.

The vehicle control method according to the present invention adjusts a speed of a vehicle operated by a driver to a predetermined target vehicle speed, or adjusts the inter-vehicle interval between the vehicle and the preceding vehicle which travels ahead of the vehicle, to a predetermined target inter-vehicle interval, independently of acceleration and deceleration operations by the driver, the vehicle control method comprises steps of obtaining information concerning the inter-vehicle interval between the vehicle and the preceding vehicle and information concerning the acceleration and deceleration operations by the driver, updating settings of the target vehicle speed and the target inter-vehicle interval according to the obtained information concerning the inter-vehicle interval and information concerning the acceleration and deceleration operations, and outputting, to a braking/driving device of the vehicle, a command for adjusting traveling state based on the updated target vehicle speed and target inter-vehicle interval.

The vehicle control system according to the present invention comprises: a preceding vehicle information obtaining unit for obtaining information concerning the preceding vehicle that travels ahead of the vehicle; a motional state sensing unit for sensing motional state of the vehicle; a controlling unit for performing calculation for adjusting the vehicle speed to a predetermined target vehicle speed, or adjusting the inter-vehicle interval between the vehicle and the preceding vehicle that travels ahead of the vehicle, to a predetermined target inter-vehicle interval, independently of the acceleration and deceleration operations by the driver; and a braking/driving device of the vehicle for receiving the command output from the controlling unit, wherein the controlling unit obtains information concerning the inter-vehicle interval between the vehicle and the preceding vehicle calculated according to the information concerning the preceding vehicle obtained by the preceding vehicle information obtaining unit and the information concerning the motional state of the vehicle obtained by the motional state the sensing unit, the controlling unit obtains information concerning the acceleration and deceleration operations by the driver, the controlling unit updates settings of the target vehicle speed and the target inter-vehicle interval according to the information concerning the obtained inter-vehicle interval and the information concerning the acceleration and deceleration operations, and the controlling unit outputs, to the braking/driving device of the vehicle, a command for adjusting the traveling state based on the updated target vehicle speed and target inter-vehicle interval.

Effects of the Invention

According to the present invention, it is possible to adjust the settings of the target inter-vehicle interval and the target vehicle speed without, for example, a dedicated switch, and thus, it is easily understood for a driver who is unfamiliar with the system for controlling the traveling state of the vehicle to reduce the burden of driving operations. Furthermore, the settings of the target inter-vehicle interval and the target vehicle speed are changed by the acceleration and deceleration operations of the vehicle based on the inter-vehicle interval (an inter-vehicle time or an inter-vehicle distance), and thus, it is possible to suppress discomfort for passengers in a variety of situations.

BRIEF DESCRIPTION OF THE DRAWINGS

FIG. 3 is a diagram explaining the target setting according to the inter-vehicle interval between the own vehicle and the preceding vehicle.

FIG. 6 is a diagram illustrating examples of the target settings in the vehicle control method of FIGS. 4 and 5.

FIG. 7A is a schematic view illustrating the own vehicle following the preceding vehicle and traveling at constant speed.

FIG. 7B is a diagram illustrating relationships between target values of the vehicle speed and the inter-vehicle interval and measured values of the vehicle speed and the inter-vehicle interval when the own vehicle follows the preceding vehicle and travels at constant speed.

FIG. 8A is a schematic view illustrating an initial state in which the own vehicle follows the preceding vehicle and travels at constant speed.

FIG. 8B is a diagram illustrating relationships between target values of the vehicle speed and the inter-vehicle interval in the initial state and measured values of the vehicle speed and the inter-vehicle interval in the initial state in which the own vehicle follows the preceding vehicle and travels at constant speed.

FIG. 9A is a schematic view illustrating override caused by the driver from the initial state of FIGS. 8A and 8B.

FIG. 9B is a diagram illustrating relationships between target values of the vehicle speed and the inter-vehicle interval and measured values of the vehicle speed and the inter-vehicle interval, when causing the override by the driver from the initial state of FIGS. 8A and 8B.

FIG. 10A is a schematic view illustrating the initial state in which the own vehicle follows the preceding vehicle and travels at a constant speed.

FIG. 10B is a diagram illustrating relationships between target values of the vehicle speed and the inter-vehicle interval and measured values of the vehicle speed and the inter-vehicle interval in the initial state in which the own vehicle follows the preceding vehicle and travels at a constant speed.

FIG. 11A is a schematic view illustrating override caused by the driver from the initial state of FIGS. 10A and 10B.

FIG. 11B is a diagram illustrating relationships between target values of the vehicle speed and the inter-vehicle interval and measured values of the vehicle speed and the inter-vehicle interval, when causing the override by the driver from the initial state of FIGS. 10A and 10B.

FIG. 12A is a schematic view illustrating when continuing the override by the driver from the override state of FIGS. 11A and 11B.

FIG. 12B is a diagram illustrating relationships between target values of the vehicle speed and the inter-vehicle interval and measured values of the vehicle speed and the inter-vehicle interval, when continuing the override by the driver from the override state of FIGS. 11A and 11B.

FIG. 13A is a schematic view illustrating when the own vehicle is close to the preceding vehicle by continuing the override by the driver.

FIG. 13B is a diagram illustrating relationships between target values of the vehicle speed and the inter-vehicle interval and measured values of the vehicle speed and the inter-vehicle interval, when the own vehicle is close to the preceding vehicle by continuing the override by the driver.

FIG. 14A is a schematic view illustrating when the preceding vehicle changes a lane from the close state of FIGS. 13A and 13B.

FIG. 14B is a diagram illustrating relationships between target values of the vehicle speed and the inter-vehicle interval and measured values of the vehicle speed and the inter-vehicle interval, when the preceding vehicle changes the lane from the close state of FIGS. 13A and 13B.

FIG. 15A is a schematic view illustrating when the own vehicle and a neighboring vehicle in the right lane travel in parallel.

FIG. 15B is a diagram illustrating relationships between target values of the vehicle speed and the inter-vehicle interval and measured values of the vehicle speed and the inter-vehicle interval, when the own vehicle and the neighboring vehicle in the right lane travel in parallel.

FIG. 16A is a schematic view illustrating when the neighboring vehicle traveling in the right lane suddenly enters into the lane on which the own vehicle travels from the parallel traveling state in FIGS. 15A and 15B.

FIG. 16B is a diagram illustrating relationships between target values of the vehicle speed and the inter-vehicle interval and measured values of the vehicle speed and the inter-vehicle interval, when the neighboring vehicle traveling in the right lane suddenly enters into the lane on which the own vehicle travels from the parallel traveling state in FIGS. 15A and 15B.

FIG. 20 is a diagram illustrating examples of the target settings in the vehicle control method of FIGS. 18 and 19.

FIG. 21 is a timing chart illustrating relationships between the change of the target setting and a pedal operation period when there is no preceding vehicle in the first embodiment.

FIG. 25A is a schematic view illustrating the movements of the preceding vehicle and the own vehicle, of which follow-up control function is weakened when operating a direction indicator.

FIG. 25B is a schematic view illustrating the movements of the preceding vehicle and the own vehicle, of which the follow-up control function is weakened when operating the direction indicator.

MODE FOR CARRYING OUT THE INVENTION

Hereinafter, embodiments of the present invention will be described with reference to the drawings.

Figure 1:
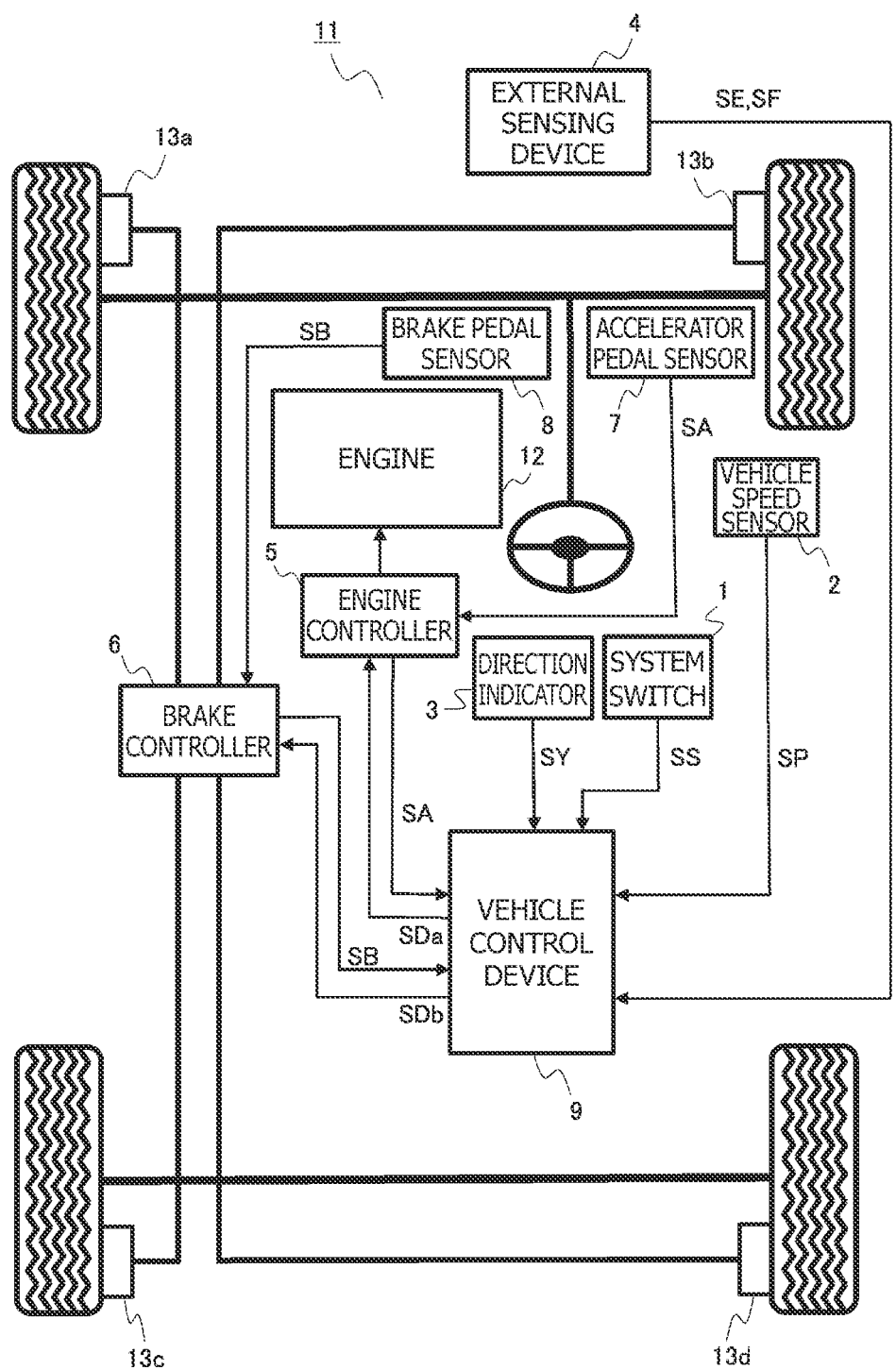
FIG. 1 is a schematic configuration view of a vehicle control system according to an embodiment of the present invention.

FIG. 1 is a schematic configuration view of a vehicle control system according to an embodiment of the present invention. The vehicle control system comprises, for example, a system switch 1, a vehicle speed sensor 2, a direction indicator 3, an external sensing device 4, an engine controller 5, a brake controller 6, an accelerator pedal sensor 7, a brake pedal sensor 8, and a vehicle control device 9.

Vehicle control device 9 controls a braking/driving device for braking/driving a vehicle 11. The braking/driving device has functions of combining braking function of braking devices (such as brakes 13a to 13d, and a motor regeneration) with driving function of driving devices (such as an engine 12, and a motor). That is, vehicle control device 9 outputs a braking/driving device command SD (a braking device command Sda and a driving device command SDb) to engine controller 5 for controlling engine 12 and to brake controller 6 for controlling brakes 13a to 13d, and assists the driving of vehicle 11 by the driver.

System switch 1 generates an assistance request signal SS for requesting driving assistance from the driver (not limited to the driver but also vehicle passengers, and hereinafter, it is assumed that the driver operates system switch 1) to output the generated assistance request signal SS to vehicle control device 9. System switch 1 determines whether the so-called "automatic operation level 2" function is turned on or off. System switch 1 is turned on to generate the support request signal SS, and turning off system switch 1 serves as support stop signal. To system switch 1, various devices which generate signals for requesting assistance of both steering operation and the braking/driving operation of vehicle 11, can be applied, such as switches for various operations, detection switch for detecting some movements, a voice input microphone.

Vehicle speed sensor 2 detects a vehicle speed of vehicle 11 and outputs a vehicle speed signal SP to vehicle control device 9. Direction indicator 3 indicates when vehicle 11 turns right or left, and outputs an operation state signal SY to vehicle control device 9. Furthermore, external sensing device 4 is provided with an external sensor such as a stereo camera and a radar, and detect the preceding vehicle (or front-traveling vehicle, hereinafter, which is referred to as a preceding vehicle in the present embodiment). Then, external sensing device 4 detects the state of the outside of vehicle 11 and outputs a signal SE indicating the detected result of the preceding vehicle and a signal SF indicating the detected result of a speed limit, to vehicle control device 9.

Accelerator pedal sensor 7 detects the accelerator pedal opening (the stepped amount of the accelerator pedal), and outputs a detected signal SA to engine controller 5. Brake pedal sensor 8 detects the brake pedal stepped degree (the stepped amount of the brake pedal), and outputs a detected signal SB to brake controller 6. Detected signal SA is input to vehicle control device 9 via engine controller 5, and detected signal SB is input to vehicle control device 9 via brake controller 6.

Figure 2:
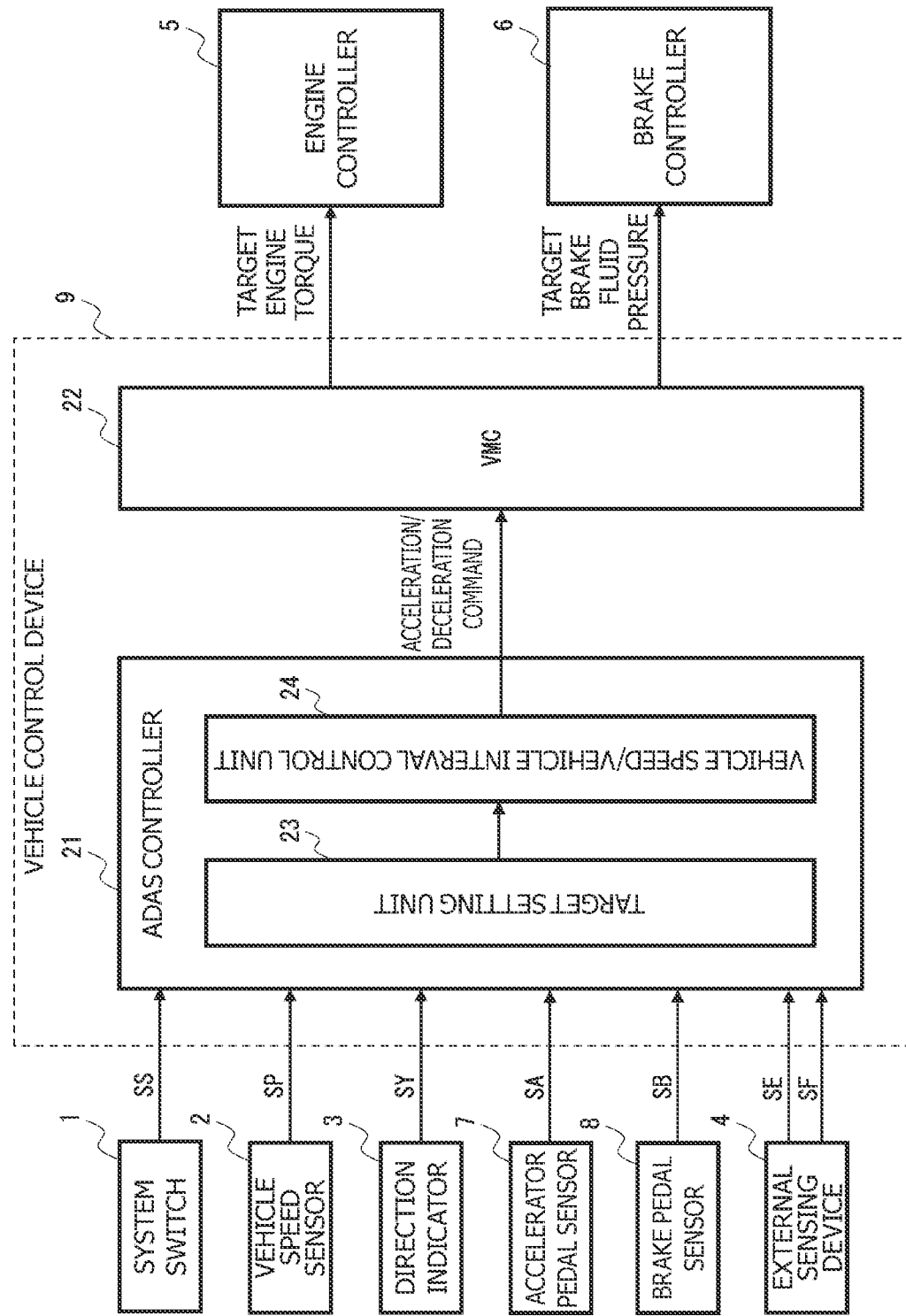
FIG. 2 is a block view of an extracted main part of the vehicle control system of FIG. 1.

FIG. 2 is a block view of an extracted main part of the vehicle control system of FIG. 1. Vehicle control device 9 is composed of an advanced driver assistance systems (ADAS) controller 21 and a Vehicle Motion Control (VMC) 22. ADAS controller 21 (controller) performs control calculations for the former steps of driving control such as Adaptive Cruise Control (ACC) and lane control, and includes a target setting unit 23 and a vehicle speed/vehicle interval control unit 24.

Into ADAS controller 21, assistance request signal SS from system switch 1, vehicle speed signal SP from vehicle speed sensor 2, an operation state signal SY indicating the operation state of the direction instruction from direction indicator 3, and detected signal SA of the accelerator pedal opening from accelerator pedal sensor 7 via engine controller 5, detected signal SB of the brake pedal stepped degree from brake pedal sensor 8 via brake controller 6, and signal SE indicating the detected result of the preceding vehicle and signal SF indicating the detected result of the speed limit from the external sensor of external sensing device 4, are input. ADAS controller 21 sets targets for the inter-vehicle interval and the vehicle speed based on the information input from these sensors. That is, it is calculated how much vehicle 11 is to be accelerated or decelerated.

Target setting unit 23 calculates the target vehicle speed and the target vehicle interval (target inter-vehicle time or target inter-vehicle distance) based on the information output from various sensors. The calculated target vehicle speed and target vehicle interval are output to vehicle speed/vehicle interval control unit 24. Vehicle speed/vehicle interval control unit 24 generates an acceleration/deceleration command according to the target vehicle speed and the target vehicle interval and outputs the acceleration/deceleration command to VMC 22.

In VMC 22, an output of engine 12 required to achieve the target vehicle speed and the target vehicle interval is calculated based on the input acceleration/deceleration command, hydraulic pressures of brakes 13a to 13d are calculated, and based on the calculated hydraulic pressures of brakes 13a to 13d, the actual throttle openings are determined, and the distribution of brake fluid pressure (four wheels) are determined. Then, VMC 22 outputs a target engine torque to engine controller 5, and outputs a target brake fluid pressure to brake controller 6.

In the example of FIG. 2, ADAS controller 21 is separated from VMC 22 which operates an actuator of vehicle 11; however, ADAS controller 21 and VMC 22 may be integrated together.

FIG. 3 is a diagram explaining the target setting according to the inter-vehicle interval between the own vehicle and the preceding vehicle, and illustrates the target settings for the pedal operation. In the present invention, the target vehicle speed and the target inter-vehicle interval are set based on the pedal operation (the operations of the accelerator pedal and the brake pedal) according to the inter-vehicle interval (the inter-vehicle distance or the inter-vehicle time).

If the inter-vehicle interval is very long or there is no preceding vehicle (if the inter-vehicle interval is greater than the first threshold), the setting of the target vehicle speed is changed and the setting of the target inter-vehicle interval is not changed. The setting of the target vehicle speed is changed by comparing a traveling speed with the vehicle speed toward the end of the accelerator pedal operation by the driver and selecting the higher one of the two speeds (higher speed). Alternatively, the setting of the target vehicle speed is changed by comparing the traveling speed with the vehicle speed toward the end of the brake pedal operation by the driver and selecting the lower one of the two speeds (lower speed).

When the inter-vehicle interval is between a predetermined interval D1 (the first threshold for a large interval) and a predetermined interval D2 (the second threshold for a small interval), the setting of the target vehicle speed is changed and the setting of the target inter-vehicle interval is also changed. The setting of the target inter-vehicle interval is changed by comparing the traveling speed with the vehicle speed toward the end of the accelerator pedal operation by the driver and selecting the higher speed, and furthermore, add a predetermined value α to the selected vehicle speed.

Here, the predetermined value α is a speed for absorbing speed fluctuation (variation), and even if the traveling speed of the preceding vehicle increases, by allowing margin of about 10 km, the own vehicle can follow the preceding vehicle, and it is unnecessary for the driver to frequently increase the vehicle speed by operating the accelerator pedal. Alternatively, the setting of the traveling vehicle speed is changed by comparing the traveling speed with the vehicle speed toward the end of the brake pedal operation by the driver and selecting the lower speed.

On the other hand, the setting of the target inter-vehicle interval is changed by comparing the inter-vehicle distance with the inter-vehicle interval toward the end of the accelerator pedal operation by the driver and selecting the shorter distance of the two. Alternatively, the setting of the target inter-vehicle interval is changed by comparing the inter-vehicle distance with the inter-vehicle interval toward the end of the brake pedal operation by the driver and selecting the longer distance of the two.

When the inter-vehicle interval is very short (smaller than the second threshold), the setting of the target vehicle speed is not changed; however, the setting of the target inter-vehicle interval is changed. The setting of the target inter-vehicle interval is changed by comparing the inter-vehicle distance with the inter-vehicle interval toward the end of the accelerator pedal operation by the driver and selecting the shorter interval. Alternatively, the setting of the target inter-vehicle interval is changed by comparing the inter-vehicle distance with the inter-vehicle interval toward the end of the brake pedal operation by the driver and selecting the longer interval.

As described above, after system switch 1 is turned on, whether the own vehicle is accelerating or decelerating based on the accelerator pedal operation and the brake pedal operation by the driver, is determined, and the target vehicle speed and the target inter-vehicle interval are set according to the inter-vehicle distance. Thus, without operating other switches, the driver can make the desired settings by only operating the pedal.

Furthermore, when the inter-vehicle distance between the own vehicle and the preceding vehicle is very long, or when there is no preceding vehicle, the driver pays more attention to adjusting the vehicle speed than the inter-vehicle interval. Thus, it is possible to suppress discomfort for the driver by changing the target vehicle speed without changing the target inter-vehicle interval. Furthermore, when the preceding vehicle travels at the middle distance between near and far from the own vehicle, the target vehicle speed is changed by adding the predetermined value α to the vehicle speed of the own vehicle. Thus, it is possible to respond to the acceleration and deceleration of the preceding vehicle and suppress discomfort for the driver. Furthermore, when the preceding vehicle travels close to the own vehicle, the driver pays more attention to adjusting the inter-vehicle interval than the vehicle speed. Thus, it is possible to suppress discomfort for the driver by changing the target inter-vehicle interval without changing the target vehicle speed. Accordingly, it is possible to suppress discomfort for the driver in a variety of situations.

First Embodiment

Figure 4:
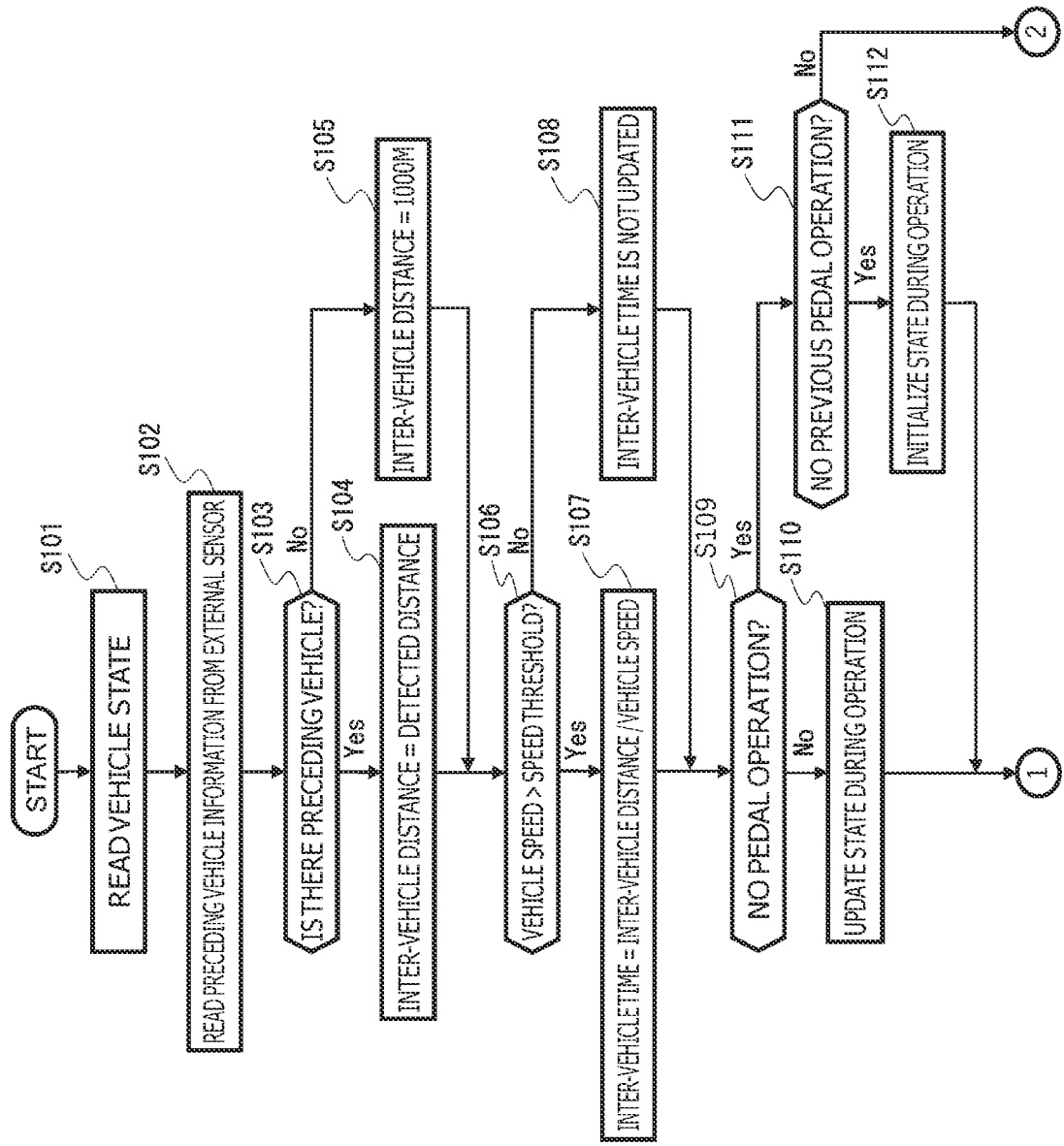
FIG. 4 is a flowchart of a vehicle control method according to a first embodiment of the present invention.
Figure 5:
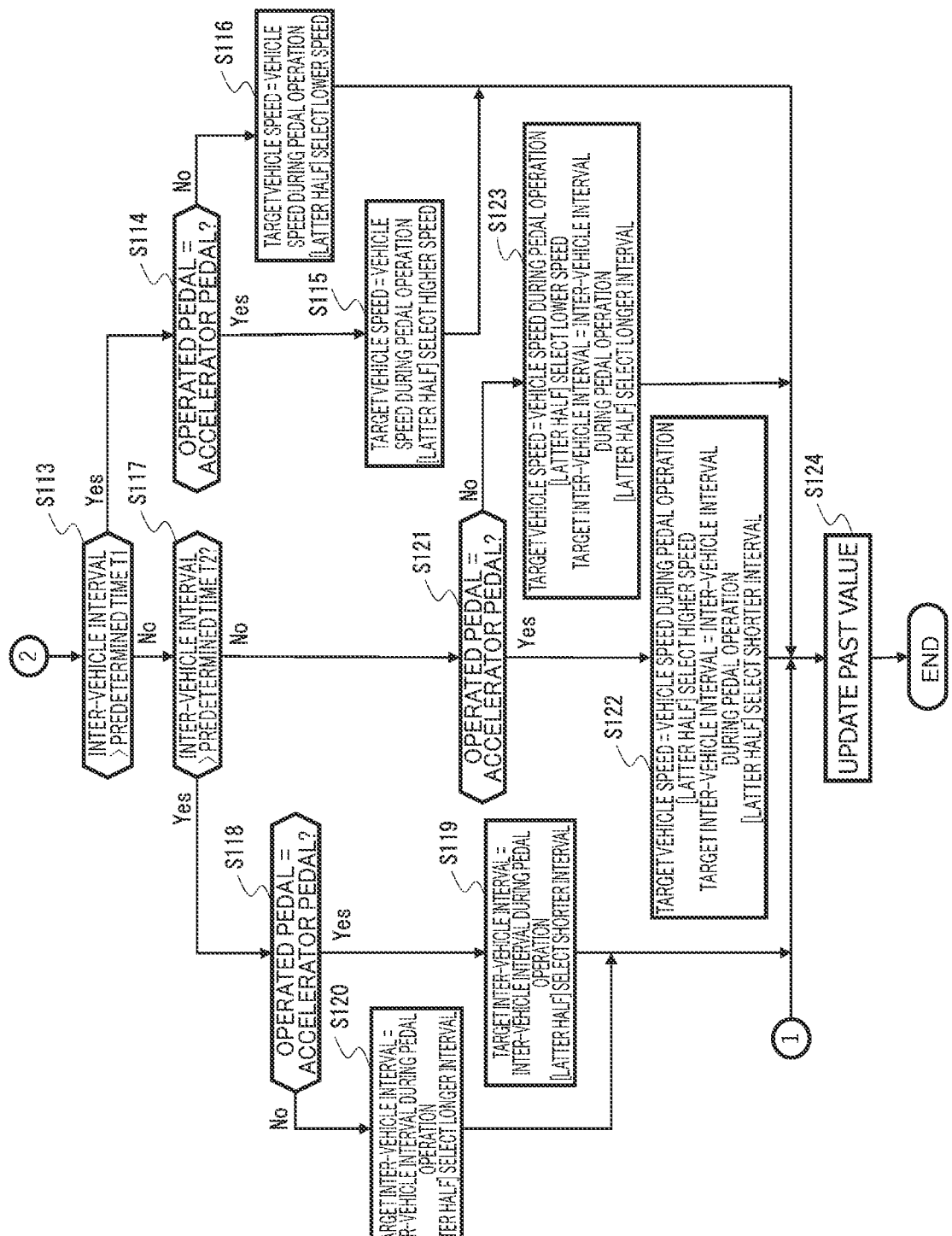
FIG. 5 is a flowchart of the vehicle control method following FIG. 4.

The vehicle control method for performing the operation as described above, will be described with reference to FIGS. 4 and 5. FIGS. 4 and 5 are the flowchart of the vehicle control method according to the first embodiment of the present invention.

In the first embodiment, based on the vehicle speed control unit and the inter-vehicle distance control unit in a general cruise control system, target values are set in these control units by the following steps. Thus, in the first embodiment, which is an example of the driving control method, it is easy to understand for drivers unfamiliar with the system for controlling the vehicle driving state, burdens on driver's operation can be reduced, and in various situations, it is possible to increase usability and suppress discomfort for the driver.

First, in step S101, the vehicle state is read into ADAS controller 21. For example, vehicle speed signal SP (traveling speed) of the own vehicle is read from vehicle speed sensor 2, detected signal SA of the accelerator pedal opening is read from accelerator pedal sensor 7, and detected signal SB of the brake pedal stepped degree (the stepped amount of the brake pedal) is read from brake pedal sensor 8.

In step S102, information such as the position and relative speed of the preceding vehicle is read by the external sensor of external sensing device 4.

In step S103, whether or not the preceding vehicle travels is determined based on the information obtained in S102. If it is determined that the preceding vehicle travels, the process proceeds to step S104, and in the other case, proceeds to step S105.

In step S104, the value of the inter-vehicle distance to be used hereinafter is calculated from the following equation (1), and the process proceeds to step S106.

$$\text{Inter-vehicle distance} = \text{the detected distance of the preceding vehicle} \quad (1)$$

In step S105, the value of the inter-vehicle distance to be used hereinafter is calculated from the following equation (2), and the process proceeds to step S106.

$$\text{Inter-vehicle distance} = 1000[m] \quad (2)$$

In step S106, whether or not the vehicle speed is greater than the predetermined speed is determined. If it is determined that the vehicle speed is greater than the predetermined speed, the process proceeds to step S107, and in other cases, proceeds to step S108. The determination of the vehicle speed is executed depending on whether the following conditional equation (3) is satisfied.

$$\text{Vehicle speed} > \text{speed threshold} \quad (3)$$

Here, the speed threshold value is set to an extremely low speed such as 3 km/h.

In step S107, the inter-vehicle time is calculated from the following equation (4), and the process proceeds to step S109.

$$\text{Inter-vehicle time} = \text{inter-vehicle distance/vehicle speed} \quad (4)$$

In step S108, the process proceeds to step S109 without updating the inter-vehicle time.

In step S109, whether or not the pedal is operated by the driver is determined. If it is determined that the pedal is not operated, the process proceeds to step S111, and if it is determined that the pedal is operated, the process proceeds to step S110.

In step S110, the traveling state during the pedal operation is stored as follows, and the process proceeds to step S124.

Vehicle speed during the operation [this time]=current vehicle speed read in step S101

Inter-vehicle interval during the operation [this time] =current inter-vehicle time read in step S107 or S108

In the first embodiment of the present invention, the inter-vehicle time which is intuitive and easy to handle, is used; however, the inter-vehicle distance may be used.

In step S111, it is determined that the pedal operation is not performed in the previous processing cycle, the process proceeds to step S112, and it is determined that the pedal operation is performed in the previous processing cycle, the process proceeds to step S113.

In step S112, the following equation is used to initialize the traveling state in preparation for the pedal operation, and the process proceed to step S124.

Vehicle speed during the pedal operation (all stored contents of the past 10 s (10 seconds))=current vehicle speed read in step S101

Inter-vehicle interval (all stored contents of the past 10 s (10 seconds))=current inter-vehicle time read in step S107 or S108.

In step S113, if a condition "the inter-vehicle time between the own vehicle and the preceding vehicle>a predetermined time T1" is satisfied at the timing which corresponds to the end of the driver's pedal operation, the process proceeds to step S114, and in other cases, proceeds to step S117.

Here, the abovementioned predetermined time T1 is a time period such as 2.7 s.

After the pedal operation, if the inter-vehicle time is longer than the predetermined time T1 (sufficient distance between the own vehicle and the preceding vehicle, or no preceding vehicle), only the target vehicle speed is changed. When the inter-vehicle time is long (sufficient distance between the own vehicle and the preceding vehicle), the driver tends to operate the pedal to pay attention to adjusting the vehicle speed, and thus, it is possible to suppress discomfort for the driver.

In step S114, whether or not the immediately previous operated pedal is the accelerator pedal is determined, and if the immediately previous operated pedal is the accelerator pedal, the process proceeds to step S115, and if the immediately previous operated pedal is not the accelerator pedal (that is, the brake pedal), the process proceeds to step S116.

In step S115, the setting of the target vehicle speed is changed according to the following equation (5), and the process proceeds to step S124.

$$\text{Target vehicle speed} = \text{maximum vehicle speed during the pedal operation between the immediate past and a predetermined time in the past} \quad (5)$$

Here, for example, the predetermined period from the latest to the past is set to be 3 s shorter than the entire storage period. In the first embodiment, this predetermined period is set to be shorter than the entire period for clarity; however, the entire storage period may be 3 s which is shorter than the actual period of the pedal operation.

Furthermore, the "+predetermined target speed" as in step S122 is not added to the setting of the target vehicle speed. This is because when the inter-vehicle distance between the own vehicle and the preceding vehicle is too long, the driver does not consider the own vehicle as a following vehicle which needs to adjust the inter-vehicle distance. Thus, the target speed is set to a speed that directly corresponds to the driver's pedal operation.

It is preferable to set the abovementioned change of the target vehicle speed based on the traveling state after the latter half of the pedal operation period of the driver (the last step of the pedal operation). When the pedal operation period is long, even if the driver forgets a past traveling state, the past traveling state is not taken into consideration, and thus, it is possible to suppress discomfort for the driver. Furthermore, since the target vehicle speed is set without taking the pedal stepped amount into the consideration, it is possible to suppress discomfort for the driver.

In the next step S116, the setting of the target vehicle speed is changed according to the following equation (6), and the process proceeds to step S124.

$$\text{Target vehicle speed} = \text{minimum vehicle speed during the pedal operation between the immediate past and the predetermined time in the past} \quad (6)$$

In step S117, if a condition "the inter-vehicle time between the own vehicle and the preceding vehicle<a predetermined time T2" is satisfied, the process proceeds to step S118, and in other cases, proceeds to step S121.

Here, the abovementioned predetermined time T2 has a relationship "predetermined time T1>predetermined time T2", and is a time period such as 0.7 s.

As described above, after the pedal operation, if the inter-vehicle interval is shorter than predetermined time T2 (the own vehicle travels near the preceding vehicle), it is preferable to change only the target inter-vehicle interval. When the inter-vehicle interval between the own and preceding vehicles is short, the driver tends to operate the pedal to pay attention to adjusting the inter-vehicle interval, and thus, it is possible to suppress discomfort for the driver.

In step S118, whether or not the immediately previous operation pedal is an accelerator pedal is determined, and if the immediately previous operated pedal is the accelerator pedal, the process proceeds to step S119, and if the immediately previous operated pedal is not the accelerator pedal (that is, brake pedal), the process proceeds to step S120.

In step S119, the setting of the target inter-vehicle interval is changed according to the following equations (7) and (8), and the process proceeds to step S124.

IF (vehicle speed>speed threshold) THEN {target inter-vehicle interval=shortest inter-vehicle interval during the pedal operation between the immediate past and the predetermined time in the past}     (7)

ELSE {target inter-vehicle interval=predetermined time T2+(the inter-vehicle distance−3 m)/10}     (8)

Here, the IF (condition) THEN {equation 1} ELSE {equation 2} is a function that executes "equation 1" if the condition is satisfied, and in the other case, executes "equation 2".

In step S120, the setting of the target inter-vehicle interval is changed according to the following equations (9) and (10), and the process proceeds to step S124.

IF (vehicle speed>speed threshold) THEN {target inter-vehicle interval=longest inter-vehicle interval during the pedal operation between the immediate past and the predetermined time in the past}     (9)

ELSE {target inter-vehicle interval=predetermined time T2+(the inter-vehicle distance−3 m)/10}     (10)

In step S121, whether or not the immediately previous operation pedal is an accelerator pedal is determined, and if the immediately previous operated pedal is the accelerator pedal, the process proceeds to step S122, and if the immediately previous operated pedal is not the accelerator pedal (that is, brake pedal), the process proceeds to step S123.

After the pedal operation, if the inter-vehicle interval is between predetermined times T1 and T2, the target inter-vehicle interval and the target vehicle speed are set, and it is preferable to set the target vehicle speed higher than the traveling speed by the predetermined value. In the above settings, when controlling the own vehicle to follow the preceding vehicle, the own vehicle can follow the preceding vehicle even if the preceding vehicle accelerates slightly, to increase the convenience.

In step S122, the setting of the target inter-vehicle interval is changed according to the following equations (11) and (12), and the process proceeds to step S124.

Target vehicle speed=maximum vehicle speed during the pedal operation between the immediate past and the predetermined time in the past+the predetermined target speed     (11)

Target inter-vehicle interval=shortest inter-vehicle interval during the pedal operation between the immediate past and the predetermined time in the past     (12)

Here, the predetermined target vehicle speed is a lower speed such as 10 km/h. Accordingly, the target vehicle speed of the own vehicle which follows the preceding vehicle can be set at "the own vehicle speed=10 km/h", and thus, even if the preceding vehicle accelerates slightly, the follow-up control can be continued.

In step S123, the setting of the target inter-vehicle interval is changed according to the following equations (13) and (14), and the process proceeds to step S124.

Target vehicle speed=minimum vehicle speed during the pedal operation for between the immediate past and the predetermined time in the past     (13)

Target inter-vehicle interval=longest inter-vehicle interval during the pedal operation between the immediate past and the predetermined time in the past     (14)

Furthermore, the "+predetermined target speed" as in step S122 is not added to the setting of the target vehicle speed. Accordingly, when decelerating, the vehicle speed can be controlled to be the target vehicle speed which directly responds to the driver's pedal operation.

In step S124, the past value is updated and the process ends. For example, the stepped amount of the immediately previous operated pedal is updated to the pedal stepped amount read in step S101, and the memory of the vehicle speed or the inter-vehicle interval during the pedal operation is updated for one processing step.

FIG. 6 is a diagram illustrating examples of the target settings in the vehicle control method according to the first embodiment described above. When the inter-vehicle time between the own vehicle and the preceding vehicle is longer than the predetermined time T1, the setting of the target vehicle speed is changed and the setting of the inter-vehicle interval between the target vehicles is not changed. The setting of the target vehicle speed is changed by comparing the traveling speed with the vehicle speed in the latter 3 s of the accelerator pedal operation by the driver and selecting the higher speed. Alternatively, the setting of the target vehicle speed is changed by comparing the traveling speed with the vehicle speed in the latter 3 s of the brake pedal operation by the driver and selecting the lower speed.

Furthermore, when the inter-vehicle time between the own vehicle and the preceding vehicle is shorter than predetermined time T2, the setting of the target vehicle speed is not changed and the setting of the inter-vehicle interval between the target vehicles is changed. The setting of the target inter-vehicle interval is changed by comparing the inter-vehicle time with the inter-vehicle time during the last 3 seconds of the accelerator pedal operation by the driver and selecting the shorter time, except for traveling at the extremely low speed. Alternatively, the setting of the target inter-vehicle interval is changed by comparing the inter-vehicle time with the inter-vehicle time during the last 3 seconds of the brake pedal operation by the driver and selecting the longer time. At traveling the extremely low speed, the target inter-vehicle time is set according to the inter-vehicle distance.

If the inter-vehicle time between the own vehicle and the preceding vehicle is other than the above (predetermined time T2<the inter-vehicle time<predetermined time T1), and when the own vehicle appropriately follows the preceding vehicle, the setting of the target vehicle speed is changed and the setting of the target inter-vehicle interval is also changed. The setting of the target vehicle speed is changed by comparing the traveling speed with the vehicle speed during the last 3 seconds of the accelerator pedal operation by the driver and selecting the higher speed and add a predetermined value α (+10 km/h) to the selected vehicle speed. Alternatively, the setting of the target vehicle speed is changed by comparing the traveling speed with the vehicle speed in the latter 3 s of the brake pedal operation by the driver and selecting the lower speed. The setting of the target inter-vehicle interval is changed by comparing the current inter-vehicle time with the inter-vehicle time during the last 3 seconds of the accelerator pedal operation by the driver and selecting the shorter time. Alternatively, the setting of the target inter-vehicle interval is changed by comparing the current inter-vehicle time with the inter-vehicle time during the last 3 seconds of the brake pedal operation by the driver and selecting the longer time.

Next, the relationship between the target values of the vehicle speed and the inter-vehicle distance and the measured values of the vehicle speed and the inter-vehicle distance in various driving conditions will be described with reference to FIGS. 7A, 7B to 17A, 17B.

FIGS. 7A and 7B illustrates the relationship between the target values of the vehicle speed and the inter-vehicle distance and the measured values of the vehicle speed and the inter-vehicle distance when the own vehicle travels at a constant speed and follows the preceding vehicle.

In the initial state, as illustrated in FIG. 7A, it is assumed that the own vehicle travels under the follow-up control at the same speed (for example, 55 km/h) as the preceding vehicle (vehicle ahead) with maintaining a medium inter-vehicle time (for example, 1.5 s). Furthermore, as illustrated in FIG. 7B, it is assumed that the preceding vehicle travels at a constant speed, the target vehicle speed is 65 km/h which is obtained by adding "α" (α=10 km/h) to the measured vehicle speed of 55 km/h, and when the measured inter-vehicle time and the target inter-vehicle time are 1.5 s, the follow-up control is stable.

FIGS. 8A, 8B, 9A, and 9B illustrates the change of relationship between the target values of the vehicle speed and the inter-vehicle interval and the measured values of the vehicle speed and the inter-vehicle interval, when causing the override by the driver from the initial state in which the own vehicle follows the preceding vehicle and travels at a constant speed.

When the driver operates the accelerator pedal for the predetermined time period from the initial state in FIGS. 8A and 8B, the vehicle speed increases from 55 km/h to 60 km/h as illustrated in FIG. 9B Assuming that the preceding vehicle travels at a constant speed, as illustrated in FIG. 9A, the inter-vehicle time between the own vehicle and the preceding vehicle gradually shortens by increasing the speed of the own vehicle, and the inter-vehicle time is changed from 1.5 s to 1.0 s.

Accordingly, the inter-vehicle time is changed from "medium" to "short", and thus, the target vehicle speed is set as follows.

Target vehicle speed=set vehicle speed+α (the preceding vehicle accelerates after the pedal operation, for example, even if the preceding vehicle accelerates to 67 km/h, the own vehicle can follow the preceding vehicle with "α" in a certain inter-vehicle time)

As described above, with respect to the previous inter-vehicle time, if the inter-vehicle time becomes 1.0 s by operating the accelerator pedal to approach the preceding vehicle, the shorter one is selected from the previous inter-vehicle time 1.5 s and the current inter-vehicle time 1.0 s, to be set to the target inter-vehicle time. Accordingly, the target inter-vehicle time is set to the shorter time 1.0 s, and thus, the target inter-vehicle time is equal to the measured inter-vehicle time.

FIGS. 10A and 10B to 12A and 12B illustrate the relationship between the target values of the vehicle speed and the inter-vehicle time and the measured values of the vehicle speed and the inter-vehicle time, when further continuing the override by the driver.

Assuming that from the initial state in which the own vehicle follows the preceding vehicle and travels at the constant speed as illustrated in FIGS. 10A and 10B, the inter-vehicle interval is shortened by causing the override by the driver as illustrated in FIGS. 11A and 11B, and thereafter, as illustrated in FIGS. 12A and 12B, the driver of the own vehicle continues to operate the accelerator pedal and increase the vehicle speed from 60 km/h to 62 km/h. In contrast, the preceding vehicle travels at the constant speed, and thus, when the speed of the own vehicle increases, the inter-vehicle time between the preceding vehicle and the own vehicle is shortened to 0.9 s, which is "close (for example, 1.0 s or less)".

When the inter-vehicle time is "close", even if the vehicle speed increases, the target vehicle speed is not changed. The shorter speed of the target inter-vehicle time and the measured inter-vehicle time is selected. Accordingly, the target inter-vehicle time is set to 0.9 s.

FIGS. 13A, 13B and FIGS. 14A, 14B illustrate that when the driver of the own vehicle further operates the accelerator pedal, the inter-vehicle interval is further shortened, so that the preceding vehicle changes the lane so as to prevent the following own vehicle from approaching. As a result, the speed of the own vehicle increases from 62 km/h to 64 km/h and there is no preceding vehicle in the lane on which the own vehicle travels. Thus, the inter-vehicle distance is infinite.

When the inter-vehicle distance is very long or there is no preceding vehicle, only the target vehicle speed is changed and the target vehicle distance is not changed. At the time of transition to the constant speed control, the target vehicle speed and the measured vehicle speed are equal. After that, the vehicle speed is controlled by selecting the higher speed of the target vehicle speed and the measured vehicle speed.

Under the above vehicle speed control, "+α" is not used for setting the vehicle speed. This is because if "+α" is continued to be used when there is no preceding vehicle, the vehicle speed might increase to be too high. As the vehicle speed increases from 62 km/h to 64 km/h, the target vehicle speed becomes 64 km/h, which is the current measured vehicle speed. In contrast, the inter-vehicle time is not changed, and thus, the target inter-vehicle time remains at 0.9 s. As described above, the setting of the target value changes.

FIGS. 15A, 15B to FIGS. 17A, 17B illustrate the relationship between the target values of the vehicle speed and the inter-vehicle time and the measured values of the vehicle speed and the inter-vehicle time, when the own vehicle and the neighboring vehicle in the right lane travel in parallel, the neighboring vehicle traveling suddenly enters into the lane on which the own vehicle travels, and the driver operates the brake pedal. In the initial state in FIGS. 15A and 15B, it is assumed that the own vehicle travels under the speed control for maintaining at a constant 80 km/h when there is no preceding vehicle and the neighboring vehicle travels in the right lane at the higher speed than the own vehicle (for example, at 90 km/h). As illustrated in FIG. 16A, when the neighboring vehicle traveling in the right lane enters into the lane on which the own vehicle travels with no preceding vehicle, the preceding vehicle suddenly appears ahead of the own vehicle.

FIG. 16B illustrates the relationship between target values of the vehicle speed and the inter-vehicle distance and measured values of the vehicle speed and the inter-vehicle interval, when the neighboring vehicle traveling in the right lane suddenly enters into the lane on which the own vehicle travels and the driver operates the brake pedal. In FIG. 16B, the target vehicle speed is 80 km, and the own vehicle travels at a constant speed of 80 km (measured value), and the setting of the inter-vehicle time is 1.5 s in the initial state. It is assumed that when the neighboring vehicle traveling in the right lane suddenly enters into the lane on which the own vehicle travels, the driver prevent the own vehicle from being close to the entered vehicle (the inter-vehicle distance="close") by operating the brake pedal so as to be apart from the entered vehicle. As a result, even if the vehicle speed is reduced, the inter-vehicle distance corresponds to "close".

When the inter-vehicle distance is "close", the vehicle speed is not changed and remains at 80 km/h, and only the inter-vehicle time is changed. When changing the inter-vehicle time, selecting the longer time of the measured inter-vehicle time (0.9 s) and the target inter-vehicle time (1.5 s). Accordingly, the target inter-vehicle time remains at 1.5 s.

Figures 17A, 17B:
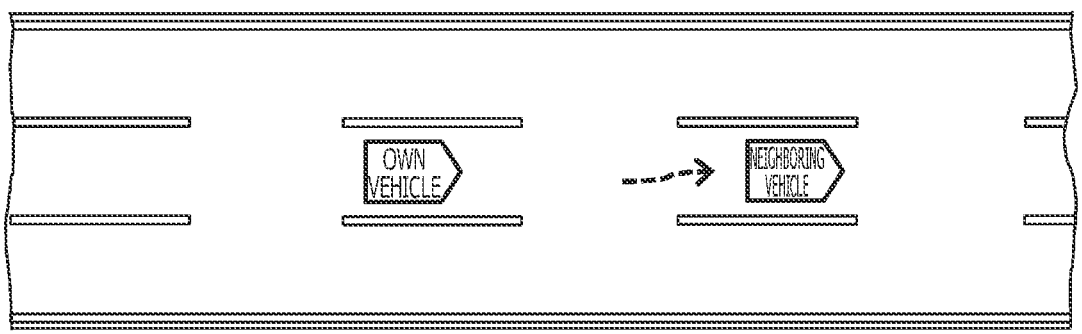
FIG. 17A is a schematic view illustrating when a brake pedal is operated when the neighboring vehicle traveling in the right lane suddenly enters into the lane on which the own vehicle travels.
FIG. 17B is a diagram illustrating relationships between target values of the vehicle speed and the inter-vehicle interval and measured values of the vehicle speed and the inter-vehicle interval, when a brake pedal is operated when the neighboring vehicle traveling in the right lane suddenly enters into the lane on which the own vehicle travels.

As illustrated in FIG. 17A, when operating the brake pedal of the own vehicle, the entered neighboring vehicle travels away from the own vehicle. When the inter-vehicle interval becomes acceptable for the driver (the inter-vehicle interval is between "long" and "short"), the driver releases the brake pedal from the operated state.

As illustrated in FIG. 17B, when the inter-vehicle time is between "long" and "short", the target vehicle speed is selected from the lower speed of the target vehicle speed of 80 km/h and "traveling vehicle speed+10 km/h (a)" which is 85 km/h. Accordingly, 80 km/h is selected as the target vehicle speed. Furthermore, the target inter-vehicle time is selected from the longer time of the measured inter-vehicle time 1.2 s and the target inter-vehicle time 1.5 s.

Next, when the driver of the own vehicle continuously operates the brake pedal, and on the other hand, the preceding vehicle travels at higher speed on the same lane, it is assumed that the own vehicle speed decreases to 75 km/h from the previous vehicle speed of 78 km/h by continuously operating the brake pedal, and the inter-vehicle time increases from 0.9 s to 1.2 s.

In this state, if the inter-vehicle time is longer than or equal to 1.0 s, the inter-vehicle distance falls within the range from "short" to "long", and thus, the target vehicle speed remains at 80 km/h. Although the inter-vehicle time becomes 1.2 s, the previous target inter-vehicle time is 1.5 s, and thus, the target inter-vehicle time remains 1.5 s because the longer time is selected as the target inter-vehicle time. As described above, the target vehicle speed and the target inter-vehicle time are not changed, and thus, it is possible to suppress discomfort for the vehicle passengers.

Second Embodiment

Figure 18:
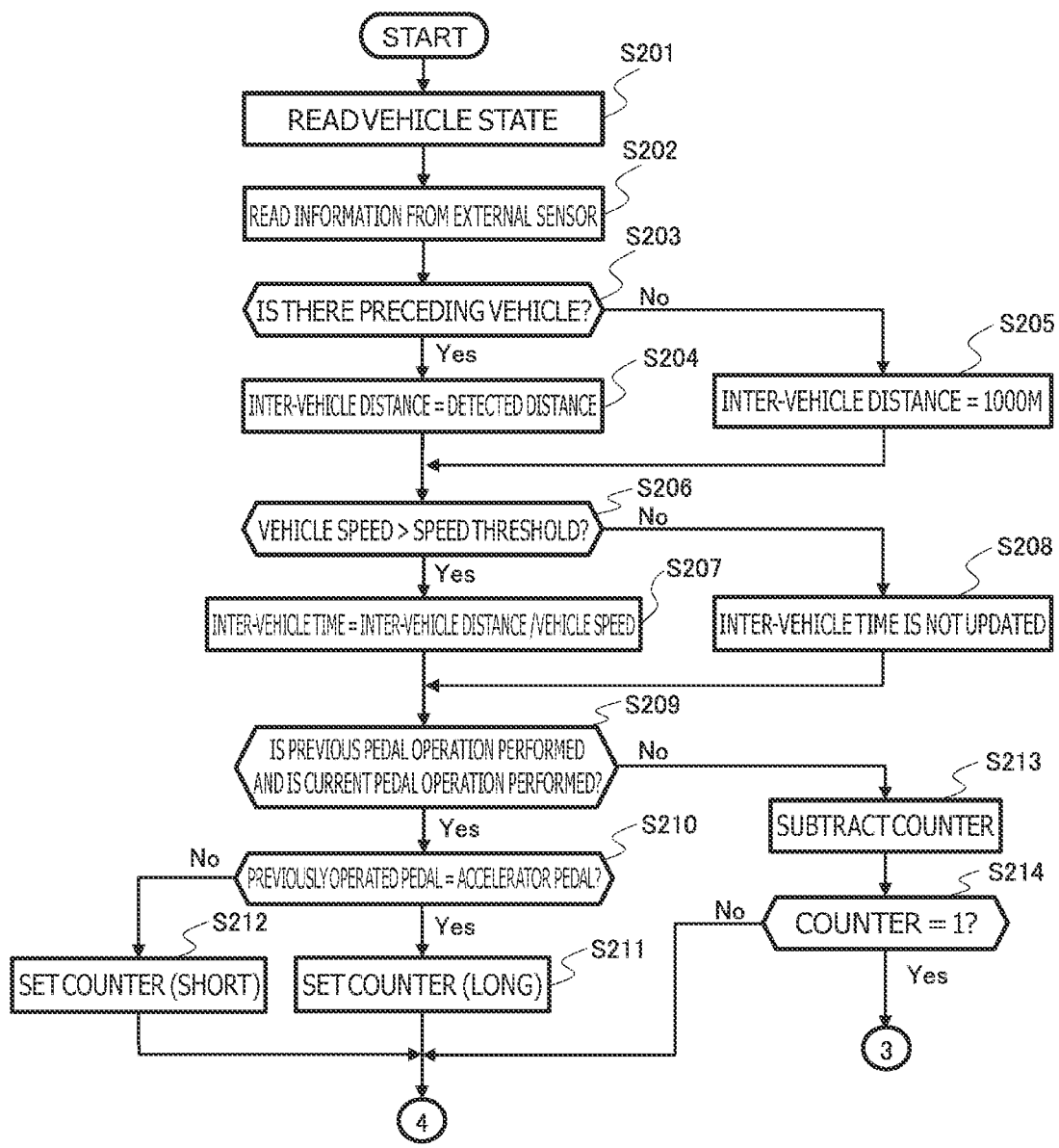
FIG. 18 is a flowchart illustrating procedures of the vehicle control method according to the second embodiment of the present invention.
Figure 19:
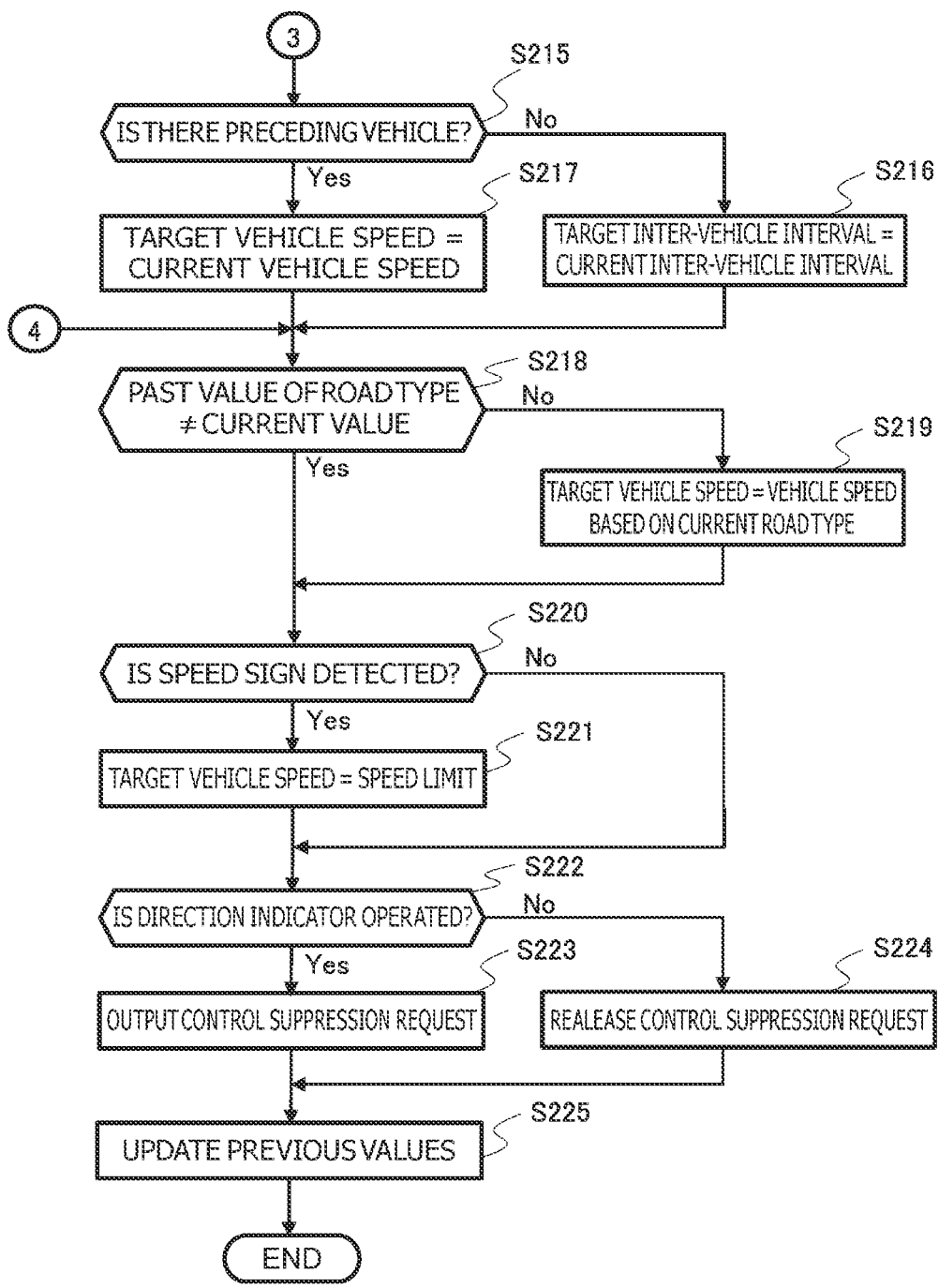
FIG. 19 is a flowchart illustrating procedures subsequent to FIG. 18.

FIGS. 18 and 19 are the flowchart illustrating procedures of the vehicle control method according to the second embodiment of the present invention. Similar to the first embodiment, the vehicle speed control unit and the inter-vehicle distance control unit in a general cruise control system are also used in the second embodiment. To these control units, target values are set by the following steps. Thus, in the second embodiment which is an example of the driving control method, it is easy to understand for drivers unfamiliar with the system for controlling the vehicle driving state, operational burdens on driver can be reduced, and in various situations, it is possible to increase usability and suppress discomfort for the driver.

In step S201, similar to step S101 of the first embodiment, the vehicle state is read into the ADAS controller 21.

In step S202, the position information of the preceding vehicle and the speed limit information of traffic signs are read by the external sensor of external sensing device 4. When detecting the speed limit sign, the target vehicle speed is reset to the value according to the speed limit sign. Accordingly, based on the detected speed limit sign, the speed limit of the area can be reset, and thus, convenience can be increased when the speed limit changes.

Steps S203 to S208 are the same as steps S103 to S108 of the first embodiment, and thus, detailed descriptions will be omitted.

In step S209, whether or not the previous pedal operation is performed is determined, and whether or not the current pedal operation is performed is determined. If it is determined that the previous pedal operation is performed and the current pedal operation is not performed, the process proceeds to step S210, and in the other case, proceeds to step S213.

In step S210, whether or not the previously operated pedal is the accelerator pedal is determined. If it is determined that the previously operated pedal is the accelerator pedal, the process proceeds to step S211, and in the other case (it is determined that the previously operated pedal is the brake pedal), proceeds to step S212.

In step S211 the counter is set according to the following equation (15) and the process proceeds to step S218.

$$\text{Counter=predetermined number of delays 1} \quad (15)$$

Here, the predetermined number of delays 1 is the number of processing counts obtained by dividing the response delay time of the engine by the processing cycle. For example, assuming that the delay time is 1 s and the processing cycle is 50 ms, the predetermined number of delays 1 is 20.

In step S212, the counter is set by the following equation (16) and the process proceeds to step S218.

$$\text{Counter=predetermined number of delays 2} \quad (16)$$

Here, the predetermined number of delays 2 is the number of processing counts obtained by dividing the response delay time of the brake pedal by the processing cycle. For example, assuming that the delay time is 0.5 s and the processing cycle is 50 ms, the predetermined number of delays 2 is 10.

The target values in the above steps S211 and S212 are changed to set each period for considering the target setting after the pedal operation to the accelerator pedal and the brake pedal. As described above, the target setting is performed by taking the vehicle behavior (fluctuation) after the pedal operation into consideration, and thus, it is possible to suppress discomfort.

In step S213, the value of the counter is subtracted by the following equations (17) and (18).

$$\text{IF (counter>0) THEN } \{\text{counter=counter}-1\} \quad (17)$$

$$\text{ELSE } \{\text{counter=0}\} \quad (18)$$

Here, the IF (condition) THEN {equation 1} ELSE {equation 2} is a function that executes "equation 1" if the condition is satisfied, and in other cases, executes "equation 2".

In step S214, whether or not the value of the counter is equal to "1" is determined. Then, if the value of the counter is "1", the process proceeds to step S215, and in other cases, the process proceeds to step S218.

In step S215, whether or not there is the preceding vehicle is determined, and if there is the preceding vehicle, the process proceeds to step S216, and in the other case, the process proceeds to step S217.

When there is the preceding vehicle and the inter-vehicle time between the own vehicle and the preceding vehicle is greater than predetermined time T1, it can be assumed that there is no preceding vehicle. Thus, the process proceeds to step S217.

In step S216, the target inter-vehicle interval is set by the following equations (19) and (20), and the process proceeds to step S218.

Target=inter-vehicle time calculated in steps S206 to S208 in the current processing cycle (19)

In step S217, the target vehicle speed is set by the following equation (20), and the process proceeds to step S218.

Target vehicle speed=own vehicle speed read in step S201 in the current processing cycle (20)

As described above, in the target setting after the driver's pedal operation, only the target inter-vehicle interval is changed when there is the preceding vehicle, and only the target vehicle speed is changed when there is no preceding vehicle. Accordingly, the relationship between the driver's pedal operation and the target value to be changed are one-to-one relationship, and thus, it is easier to understand.

In the next step S218, whether or not the past value of the road type is not equal to the current value of the road type is determined. If the previous road type differs from the current road type according to, for example, the output of a navigation device, the process proceeds to step S219, and in the other case, the process proceeds to step S220.

Furthermore, if the road type (such as general road/main road/expressway) changes, the target vehicle speed is reset to a predetermined value. Accordingly, the target vehicle speed is reset based on the speed of the general traffic flow for each road type, and thus, the convenience when the type of road changes can be increased.

In step S219, the target vehicle speed is reset by the following equations (21) to (25), and the process proceeds to step S220.

IF (the current road type=expressway) THEN {target vehicle speed=100 km/h} (21)

ELSE IF (the current type=motorway) THEN {target vehicle speed=80 km/h} (22)

ELSE IF (the current road type=main road) THEN {target vehicle speed=60 km/h} (23)

ELSE IF (the current road type=major national road) THEN {target vehicle speed=60 km/h} (24)

ELSE {target vehicle speed=40 km/h} (25)

Here, IF (condition 1) THEN {equation 1} ELSE IF (condition 2) THEN {equation 2} ELSE {equation 3} means that if condition 1 is satisfied, "equation 1" is executed, and if condition 2 is satisfied, "equation 2" is executed, and furthermore, if condition 1 and condition 2 are not satisfied, "equation 3" is executed.

In step S220, if the speed sign is detected in the current processing cycle of step S202, the process proceeds to step S221, and in the other case, the process proceeds to step S222.

In step S221, the target vehicle speed is set by the following equation (26).

Target vehicle speed=detected speed limit (26)

In step S222, if direction indicator 3 is operated, the process proceeds to step S223, and in the other case, the process proceeds to step S224.

When direction indicator 3 is operated, the abovementioned control function is directed to be weakened. Accordingly, for example, even if the preceding vehicle (which travels ahead of the own vehicle) goes straight and the own vehicle turns left at an intersection, the acceleration of the own vehicle following the preceding vehicle can be suppressed.

In the following step S223, a suppression request of the control mode is output, and the process proceeds to step S225. Here, the suppression request is a request to the later steps of the control system to limit the maximum acceleration to 0.03 G, for example.

In step S224, a suppression release request of the control mode is output, and the process proceeds to step S225.

In step S225, for example, the previous value of the road type, the previous value of the pedal operation are updated and the process ends.

FIG. 20 is a diagram illustrating examples of the target settings in the vehicle control method according to the second embodiment described above. When the pedal is operated, the target vehicle speed and the target inter-vehicle interval are set according to the external state, that is, according to whether or not there is the preceding vehicle. When there is no preceding vehicle, the target vehicle speed is set to the vehicle speed at the time when the response delay of the actuator elapses since the pedal is finally released. The target vehicle speed is not changed when there is the preceding vehicle.

Furthermore, the target inter-vehicle interval is not changed when there is no preceding vehicle. When there is the preceding vehicle, the target inter-vehicle interval is set to the inter-vehicle interval at the time when the response delay time of the actuator elapses since the pedal is finally released.

On the other hand, when the road type in the map information changes or when the speed sign is detected, the target vehicle speed is set regardless of whether or not the pedal is operated. When detecting the change in road type, the target vehicle speed is set according to the detected road type, and when the speed sign is detected, the target vehicle speed is set according to the detected speed sign. At that time, the target inter-vehicle interval is not changed.

Figure 22:
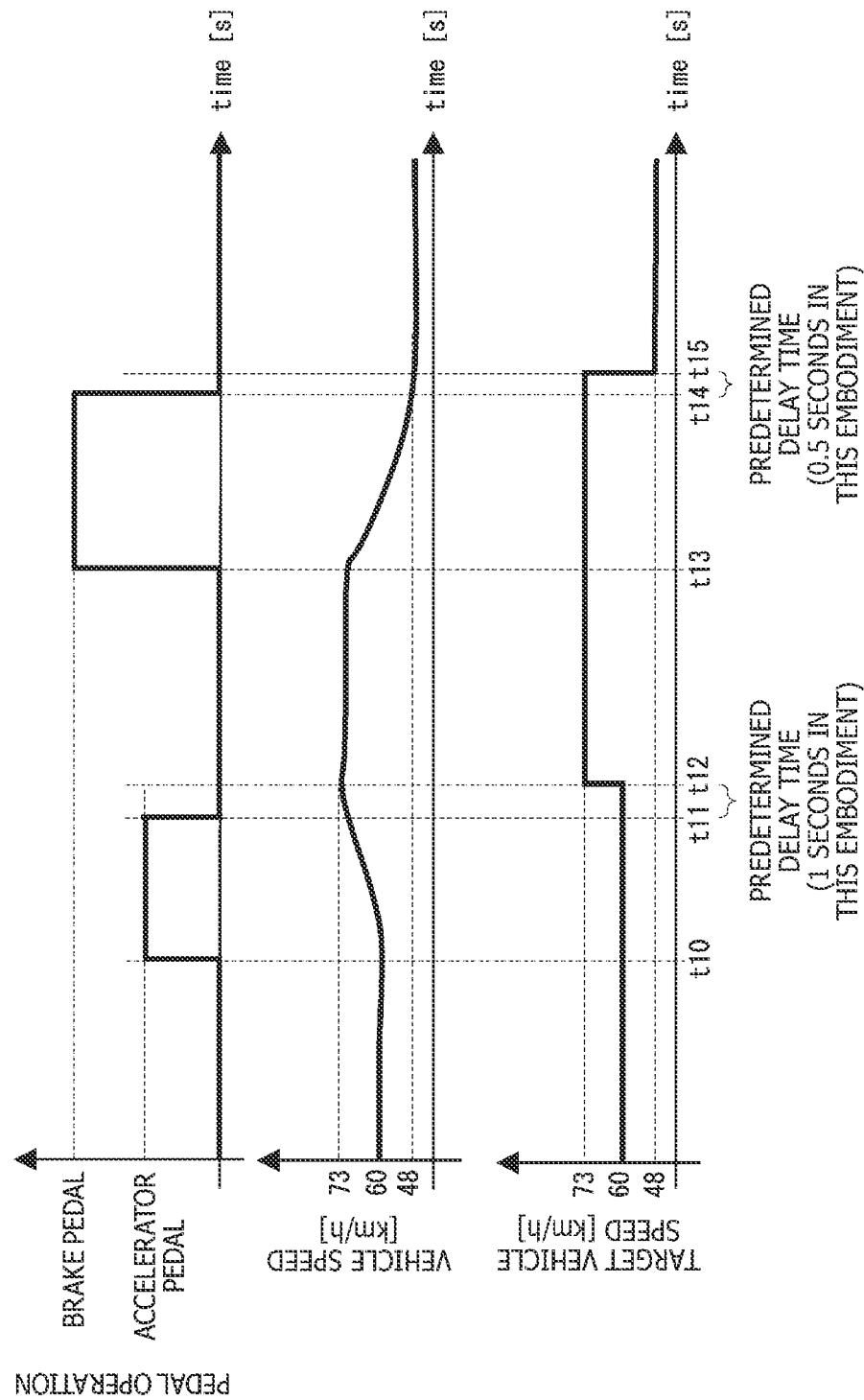
FIG. 22 is a timing chart illustrating relationships between the change of the target setting and the pedal operation period when there is no preceding vehicle in the second embodiment.

FIG. 21 is the timing chart illustrating the relationship between the change of the target setting and the pedal operation period when there is no preceding vehicle in the first embodiment. Furthermore, FIG. 22 is the timing chart illustrating the relationship between the change of the target setting and the pedal operation period when there is no preceding vehicle in the second embodiment.

As illustrated in FIG. 21, it is assumed that the accelerator pedal is operated at the timing of the time t0 and the accelerator pedal is released at the timing of the time t2. Here, in order to simplify the description, assuming that the accelerator pedal is operated by a certain amount, the vehicle speed increases monotonically as surrounded by the dashed line BL1. As the target vehicle speed, the highest speed is selected from the speed for the time period of t1 to t2 (surrounded by the dashed line BL2) in which the vehicle speed increases monotonically. Thus, in FIG. 21, the target vehicle speed is set by selecting the highest speed (70 km/h) at the time t2.

If the brake pedal is operated by a certain amount for the next time period of t3 to t5, the vehicle speed decreases monotonically, as shown surrounded by the dashed line BL3. As the target vehicle speed, the lowest speed (50 km/h) is selected from the speed for the time period of t4 to t5

(surrounded by the dashed line BL4). Thus, in FIG. 21, the target vehicle speed is set by selecting the lowest speed at the time t5.

On the other hand, in the second embodiment illustrated in FIG. 22, assuming that the accelerator pedal is operated for the time period of t10 to t11 by a certain amount, the vehicle speed increases monotonically. The target vehicle speed is set by selecting the highest speed when the response delay time of the engine elapses since the pedal is finally released at the time t11. The response delay time of the engine is set by a delay counter, and the vehicle speed (73 km) at the end of subtraction of the delay counter is set as the target vehicle speed.

Assuming that the brake pedal is operated for the time period of t13 to t15 by a certain amount, the vehicle speed decreases monotonically. The target vehicle speed is set by selecting the lowest speed when the response delay time of the brake pedal elapses since the pedal is finally released at the time t14. The response delay time of the brake pedal is set by the delay counter, and the vehicle speed (48 km) at the end of subtraction of the delay counter is set as the target vehicle speed.

FIGS. 23A, 23B, 24A, 24B, 24C, 25A, 25B, 26A, 26B and 26C illustrate the relationship among the movements of the own vehicle and the preceding vehicle, the inter-vehicle distance, and a target G when the control function is weakened and when the control function remains, when directional indicator 3 is operated.

Figure 23A:
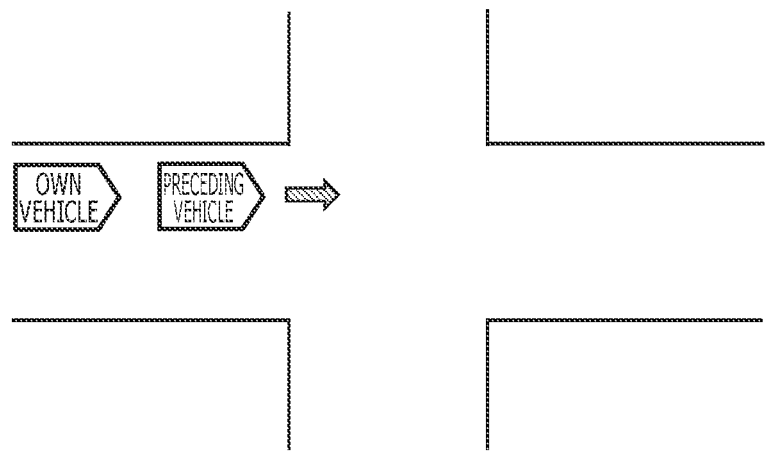
FIG. 23A is a schematic view illustrating the movements of the preceding vehicle and the own vehicle, of which follow-up control function remains when operating a direction indicator.
Figure 23B:
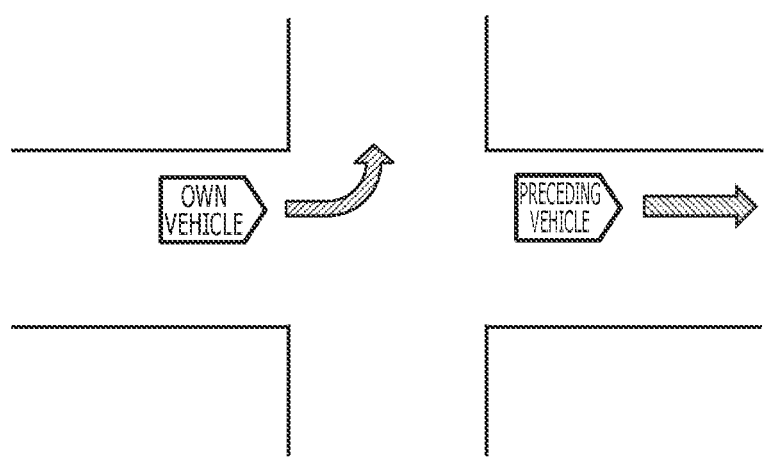
FIG. 23B is a schematic view illustrating the movements of the preceding vehicle and the own vehicle of which the follow-up control function remains when operating the direction indicator.
Figure 24A:
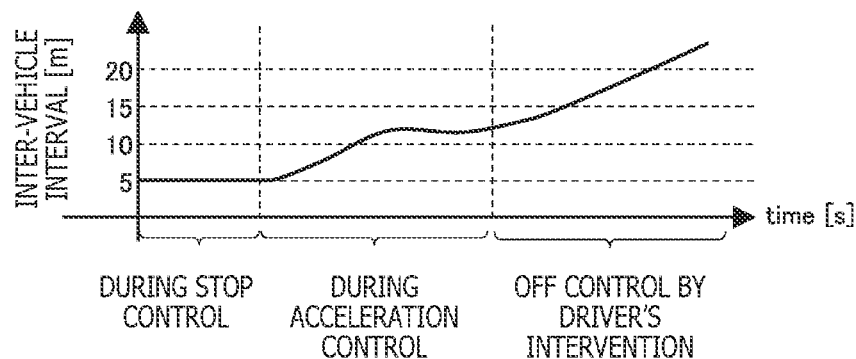
FIG. 24A is an operation timing diagram illustrating the inter-vehicle interval between the preceding vehicle and the own vehicle of which the follow-up control function remains when operating the direction indicator.
Figure 24B:
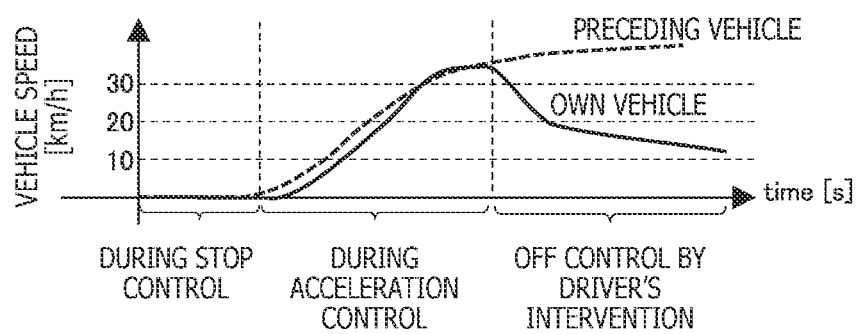
FIG. 24B is an operation timing diagram illustrating the vehicle speed of the preceding vehicle and the own vehicle of which the follow-up control function remains when operating the direction indicator.

When the own vehicle is stopped at the intersection while the preceding vehicle starts and goes straight as illustrated in FIG. 23A, the control is performed to follow the preceding vehicle even if the own vehicle is about to turn left as illustrated in FIG. 23B. As illustrated in FIG. 24B, in the vehicle stopped state, the inter-vehicle distance gradually increases from 5 m when the preceding vehicle starts. The own vehicle starts and the follow-up control is performed to follow the preceding vehicle, and thus, the inter-vehicle distance is maintained between 12 m and 13 m, and thereafter, the own vehicle turns left, and thus, the own vehicle moves away from the preceding vehicle.

Figure 24C:
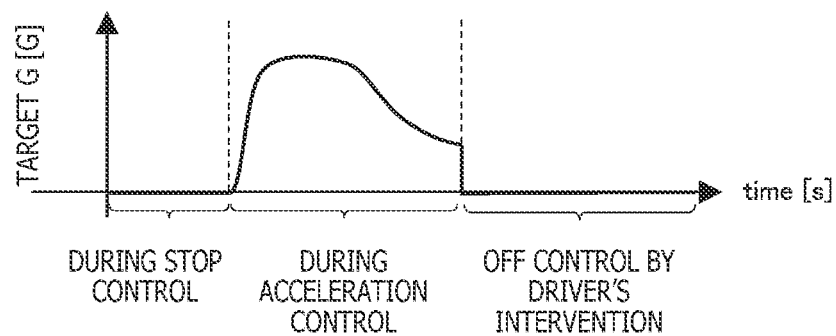
FIG. 24C is an operation timing diagram illustrating a target G when the follow-up control function remains even if the direction indicator is operated.

As illustrated in FIGS. 24B and 24C, regarding the vehicle speed and the target G, in order to catch up with the preceding vehicle which starts and accelerates, the own vehicle also starts and accelerates vigorously by the follow-up control. Thus, the driving speed may be inappropriate for turning (vehicle speed=about 30 km/h). When the own vehicle turns left while the driver the brake pedal is hurriedly operated by the driver's intervention, the follow-up control is stopped by this driver's intervention. Accordingly, the vehicle speed of the own vehicle decreases, and the target G is also set to "0".

Figure 26A:
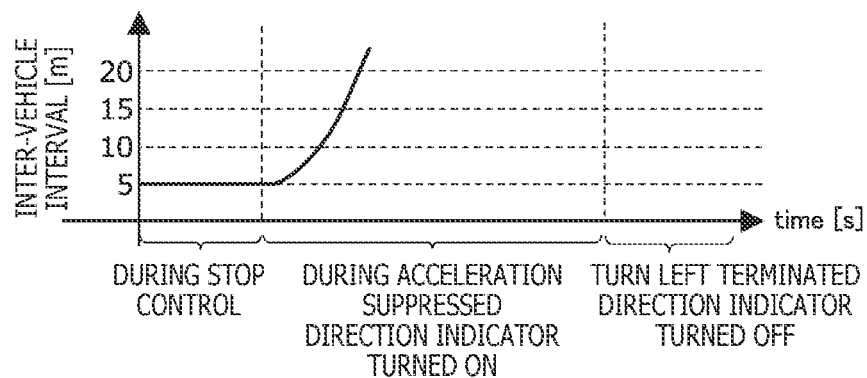
FIG. 26A is an operation timing diagram illustrating the inter-vehicle interval between the preceding vehicle and the own vehicle, of which the follow-up control function is weakened when operating the direction indicator.
Figure 26B:
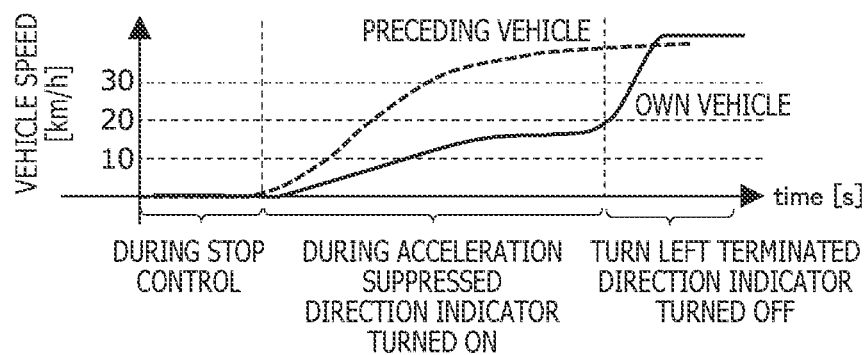
FIG. 26B is an operation timing diagram illustrating the vehicle speed of the preceding vehicle and the own vehicle, of which the follow-up control function is weakened when operating the direction indicator.

On the other hand, if the control function is weakened when direction indicator 3 is operated, the acceleration of the own vehicle can be suppressed. That is, when the own vehicle is stopped at the intersection with the direction indicator indicating a left turn while the preceding vehicle starts and goes straight as illustrated in FIG. 25A, the acceleration of the own vehicle is suppressed by stopping the follow-up control even if the preceding vehicle is accelerated, as illustrated in FIG. 25B. Accordingly, as illustrated in FIG. 26A, the inter-vehicle distance markedly increases from 5 m in the stopped state.

Figure 26C:
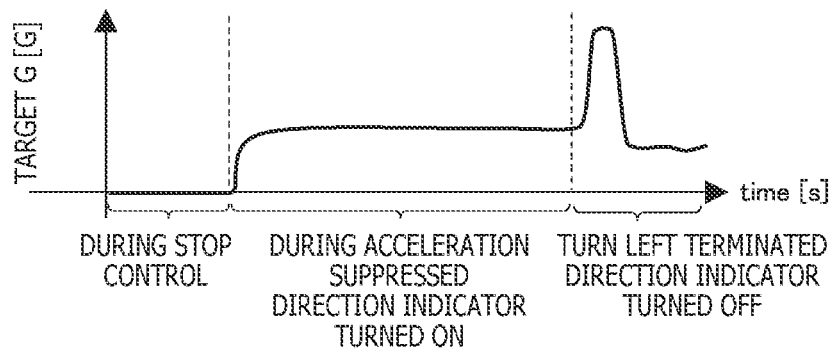
FIG. 26C is an operation timing diagram illustrating a target G when the follow-up control function is weakened even if the direction indicator is operated.

As illustrated in FIG. 25B, compared to the preceding vehicle speed, the increase in the own vehicle speed is small by increasing driving resistance caused by turning. The target G suppresses the follow-up control during the operation of the direction indicator, and thus, as illustrated in FIG. 26C, the own vehicle accelerates gradually and when the own vehicle is turned left and direction indicator 3 is turned off, the vehicle speed is controlled to the target vehicle speed to temporarily increase the target G.

As described above, according to the invention of the present Application, it is possible to adjust the settings of the target inter-vehicle interval and the target vehicle speed by the acceleration/deceleration operation of the vehicle, without, for example, a dedicated switch, and thus, it is easily for the driver who is unfamiliar with the system for controlling the traveling state of the vehicle to understand the driving operation, and the burden thereof can be reduced. Furthermore, the settings of the target inter-vehicle interval and the target vehicle speed are changed based on the inter-vehicle time or the inter-vehicle distance between the own vehicle and the preceding vehicle, and thus, it is possible to suppress discomfort for the driver (and the vehicle passengers) in a variety of situations.

The present invention is not limited to the embodiments described in the foregoing, and various modifications can be made. For example, information concerning the preceding vehicle may be obtained by vehicle-to-vehicle communication other than the external sensor.

Furthermore, of course, the acceleration/deceleration operation by the driver may be performed by using a joystick in addition to the pedal.

REFERENCE SYMBOL LIST

1 System switch
2 Vehicle sensor
3 Direction indicator
4 External sensing device
5 Engine controller
6 Brake controller
7 Accelerator pedal sensor
8 Brake pedal sensor
9 Vehicle control device
11 Vehicle
12 Engine
13a to 13d Brakes
21 ADAS controller
22 VMC
23 Target setting unit
24 Vehicle speed/vehicle interval control unit
SS Assistance request signal
SY Operation state signal
SE Signal indicating the detected result of the preceding vehicle
SF Signal indicating the detected result of the speed limit
SA Detected signal of the accelerator pedal opening
SB Detected signal of the brake pedal stepped degree
SD Braking/driving device command
SDa Braking device command
SDb Driving device command

The invention claimed is:

1. A vehicle control device comprises a controller that performs calculation for adjusting a speed of a vehicle operated by a driver to a predetermined target vehicle speed or adjusting an inter-vehicle interval between the vehicle and a preceding vehicle which travels ahead of the vehicle, to a predetermined target inter-vehicle interval, independently of acceleration and deceleration operations by the driver, wherein the controller obtains information concerning the inter-vehicle interval between the vehicle and the preceding vehicle, and information concerning the acceleration and deceleration operations by the driver, the controller updates settings of the target vehicle speed and the target inter-vehicle interval based on the obtained information concerning the inter-vehicle interval and information concerning the acceleration and deceleration operations, the controller outputs, to a braking/driving device of the own vehicle, a command for adjusting traveling state based on the updated target vehicle speed and the updated target inter-vehicle interval, the controller changes the setting of the target vehicle speed when the inter-vehicle interval between the vehicle and the preceding vehicle is greater than a first threshold according to the information concerning the inter-vehicle interval, and updates the changed setting of the target vehicle speed without changing the setting of the target inter-vehicle interval, and the controller changes the setting of the target vehicle speed by comparing a traveling speed with a vehicle speed at an end of an accelerator pedal operation by the driver and selecting a higher speed, or by comparing the traveling speed with the vehicle speed at the end of a brake pedal operation by the driver and selecting a lower speed.

2. The vehicle control device according to claim 1, wherein the controller sets the target inter-vehicle interval based on the inter-vehicle time between the vehicle and the preceding vehicle, except for traveling at an extremely low speed.

3. The vehicle control device according to claim 1, wherein the controller sets the target inter-vehicle interval based on the inter-vehicle distance between the vehicle and the preceding vehicle, at an extremely low speed.

4. The vehicle control device according to claim 1, wherein when the inter-vehicle interval between the vehicle and the preceding vehicle is greater than a first threshold according to the information concerning the inter-vehicle interval, the controller changes the setting of the target vehicle speed, and updates the changed setting of the target vehicle speed without changing the target inter-vehicle interval, and wherein when the inter-vehicle interval between the vehicle and the preceding vehicle is lower than the first threshold according to the information concerning the inter-vehicle interval, the controller changes the setting of the target inter-vehicle interval and updates the changed setting of the target inter-vehicle interval without changing the setting of the target vehicle speed.

5. The vehicle control device according to claim 1, wherein the controller reset the target vehicle speed when a road type is changed.

6. The vehicle control device according to claim 1, wherein the controller resets the target vehicle speed when a speed sign is detected.

7. The vehicle control device according to claim 1, wherein the controller changes the settings of the target vehicle speed and the target inter-vehicle interval according to operation amount of accelerator and brake pedals at the end of the acceleration and deceleration operations by the driver.

8. The vehicle control device according to claim 1, wherein the controller changes the settings of the target vehicle speed and the target inter-vehicle interval according to values after a predetermined time elapses since the acceleration and deceleration operation is ended by the driver.

9. The vehicle control device according to claim 1, wherein the controller suppresses control of the braking/driving device based on the command when an operation for changing a lane of the vehicle is performed.

10. The vehicle control device according to claim 1, wherein the command is to control the braking/driving device of the vehicle according to the target inter-vehicle distance when the preceding vehicle travels, and the commands is to control the braking/driving device of the vehicle according to the target vehicle speed when there is no preceding vehicle.

11. A vehicle control device comprises a controller that performs calculation for adjusting a speed of a vehicle operated by a driver to a predetermined target vehicle speed or adjusting an inter-vehicle interval between the vehicle and a preceding vehicle which travels ahead of the vehicle, to a predetermined target inter-vehicle interval, independently of acceleration and deceleration operations by the driver, wherein the controller obtains information concerning the inter-vehicle interval between the vehicle and the preceding vehicle, and information concerning the acceleration and deceleration operations by the driver, the controller updates settings of the target vehicle speed and the target inter-vehicle interval based on the obtained information concerning the inter-vehicle interval and information concerning the acceleration and deceleration operations, the controller outputs, to a braking/driving device of the own vehicle, a command for adjusting traveling state based on the updated target vehicle speed and the updated target inter-vehicle interval, if the inter-vehicle interval between the vehicle and the preceding vehicle is greater than a second threshold and lower than a first threshold according to the information concerning the inter-vehicle interval, the controller changes the settings of the target vehicle speed and the target inter-vehicle interval to update the settings, the controller changes the setting of the target inter-vehicle interval by comparing a traveling speed with the vehicle speed at the end of the accelerator pedal operation by the driver and selecting a higher speed and add a predetermined value to the selected vehicle speed, or by comparing the traveling speed with the vehicle speed at the end of the brake pedal operation by the driver and selecting a lower speed, and the controller changes the setting of the target inter-vehicle interval by comparing the inter-vehicle distance with the inter-vehicle interval at the end of an accelerator pedal operation by the driver and selecting a smaller interval, or by comparing the inter-vehicle distance with the inter-vehicle interval at the end of a brake pedal operation by the driver and selecting a larger interval.

12. A vehicle control device comprises a controller that performs calculation for adjusting a speed of a vehicle operated by a driver to a predetermined target vehicle speed or adjusting an inter-vehicle interval between the vehicle and a preceding vehicle which travels ahead of the vehicle, to a predetermined target inter-vehicle interval, independently of acceleration and deceleration operations by the driver, wherein the controller obtains information concerning the inter-vehicle interval between the vehicle and the preceding vehicle, and information concerning the acceleration and deceleration operations by the driver, the controller updates settings of the target vehicle speed and the target inter-vehicle interval based on the obtained information concerning the inter-vehicle interval and information concerning the acceleration and deceleration operations, the controller outputs, to a braking/driving device of the own vehicle, a command for adjusting traveling state based on the updated target vehicle speed and the updated target inter-vehicle interval, when the inter-vehicle interval between the vehicle and the preceding vehicle is lower than a second threshold according to the information concerning the inter-vehicle interval, the controller changes the setting of the target inter-vehicle interval without changing the setting of the target vehicle speed and updates the changed setting of the target inter-vehicle interval, and the controller changes setting of the target inter-vehicle interval by comparing the inter-vehicle distance with the inter-vehicle interval at the end of an accelerator pedal operation by the driver and selecting a smaller interval, or by comparing the inter-vehicle distance with the inter-vehicle interval at the end of a brake pedal operation by the driver and selecting a larger interval.

13. A vehicle control method for adjusting a speed of a vehicle operated by a driver to a predetermined target vehicle speed, or adjusting an inter-vehicle interval between the vehicle and a preceding vehicle which travels ahead of the vehicle, to a predetermined target inter-vehicle interval, independently of acceleration and deceleration operations by the driver, the vehicle control method comprising:

obtaining information concerning the inter-vehicle interval between the vehicle and the preceding vehicle;

obtaining information concerning the acceleration and deceleration operations by the driver;

updating settings of the target vehicle speed and the target inter-vehicle interval according to the obtained information concerning the inter-vehicle interval and information concerning the acceleration and deceleration operations; and outputting, to a braking/driving device of the own vehicle, a command for adjusting traveling state based on the updated target vehicle speed and the updated target inter-vehicle interval; wherein if the inter-vehicle interval between the vehicle and the preceding vehicle is greater than a second threshold and lower than a first threshold according to the information concerning the inter-vehicle interval, the controller changes the settings of the target vehicle speed and the target inter-vehicle interval to update the settings, the controller changes the setting of the target inter-vehicle interval by comparing a traveling speed with the vehicle speed at the end of the accelerator pedal operation by the driver and selecting a higher speed and add a predetermined value to the selected vehicle speed, or by comparing the traveling speed with the vehicle speed at the end of the brake pedal operation by the driver and selecting a lower speed, and the controller changes the setting of the target inter-vehicle interval by comparing the inter-vehicle distance with the inter-vehicle interval at the end of an accelerator pedal operation by the driver and selecting a smaller interval, or by comparing the inter-vehicle distance with the inter-vehicle interval at the end of a brake pedal operation by the driver and selecting a larger interval.

14. A vehicle control system of an own vehicle comprising:

preceding vehicle information obtaining unit for obtaining information concerning the preceding vehicle which travels ahead of the vehicle;

a motional state sensing unit for sensing motional state of the own vehicle, wherein the motional state sensing unit includes at least a vehicle speed sensor;

a controlling unit for performing calculation for adjusting the own vehicle speed to a predetermined target vehicle speed, or adjusting the inter-vehicle interval between the own vehicle and the preceding vehicle which travels ahead of the own vehicle, to a predetermined target inter-vehicle interval, independently of acceleration and deceleration operations by the driver, and a braking/driving device of the own vehicle for receiving the command output from the controlling unit, wherein the controlling unit obtains information concerning the inter-vehicle interval between the own vehicle and the preceding vehicle calculated according to the information concerning the preceding vehicle obtained by the preceding vehicle information obtaining unit and the information concerning the motional state of the own vehicle obtained by the motional state sensing unit, the controlling unit obtains information concerning the acceleration and deceleration operations by the driver;

the controlling unit updates settings of the target vehicle speed and the target inter-vehicle interval according to the information concerning the obtained inter-vehicle interval and the information concerning the acceleration and deceleration operation;

the controlling unit outputs, to the braking/driving device of the own vehicle, a command for adjusting the traveling state based on the updated target vehicle speed and target inter-vehicle interval, if the inter-vehicle interval between the own vehicle and the preceding vehicle is greater than a second threshold and lower than a first threshold according to the information concerning the inter-vehicle interval, the controller changes the settings of the target vehicle speed and the target inter-vehicle interval to update the settings, the controller changes the setting of the target inter-vehicle interval by comparing a traveling speed with the own vehicle speed at the end of the accelerator pedal operation by the driver and selecting a higher speed and add a predetermined value to the selected vehicle speed, or by comparing the traveling speed with the own vehicle speed at the end of the brake pedal operation by the driver and selecting a lower speed, and the controller changes the setting of the target inter-vehicle interval by comparing the inter-vehicle distance with the inter-vehicle interval at the end of an accelerator pedal operation by the driver and selecting a smaller interval, or by comparing the inter-vehicle distance with the inter-vehicle interval at the end of a brake pedal operation by the driver and selecting a larger interval.

* * * * *